(12) United States Patent
Shah et al.

(10) Patent No.: US 9,030,934 B2
(45) Date of Patent: May 12, 2015

(54) HOST-BASED QUALITY OF SERVICE FOR WIRELESS COMMUNICATIONS

(75) Inventors: Keyur C. Shah, San Diego, CA (US); Hongshi Guo, San Diego, CA (US); Jeff Dyck, San Diego, CA (US); Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 832 days.

(21) Appl. No.: 12/203,870

(22) Filed: Sep. 3, 2008

(65) Prior Publication Data

US 2009/0067372 A1 Mar. 12, 2009

Related U.S. Application Data

(60) Provisional application No. 60/970,921, filed on Sep. 7, 2007.

(51) Int. Cl.
*H04L 12/801* (2013.01)
*H04L 12/851* (2013.01)
*H04L 12/859* (2013.01)
(Continued)

(52) U.S. Cl.
CPC .............. *H04L 47/10* (2013.01); *H04L 47/14* (2013.01); *H04L 47/2441* (2013.01); *H04L 47/2475* (2013.01); *H04L 47/31* (2013.01);
(Continued)

(58) Field of Classification Search
CPC ..... H04L 47/22; H04L 47/24; H04L 47/2441; H04L 47/10; H04L 67/322; H04L 47/2475; H04L 47/14; H04L 47/31; H04W 28/16; Y02B 60/50

USPC ................ 370/229, 230, 231, 235, 351, 389, 370/395.1, 395.2, 395.21, 395.4, 395.42; 455/403, 422.1, 435, 435.2, 435.3, 455/450, 452.1, 452.2
See application file for complete search history.

(56) References Cited

U.S. PATENT DOCUMENTS 6,631,122 B1 * 10/2003 Arunachalam et al. ........ 370/332
6,937,566 B1 * 8/2005 Forslow ........................ 370/231
(Continued)

FOREIGN PATENT DOCUMENTS

| CN | 1806457 A | 7/2006 |
|----|-----------|--------|
| CN | 1906907 A | 1/2007 |

(Continued)

OTHER PUBLICATIONS

International Search Report and Written Opinion PCT/US2008/075294; Jan. 20, 2009.

(Continued)

*Primary Examiner* — Obaidul Huq
(74) *Attorney, Agent, or Firm* — Eric Ho

(57) ABSTRACT

Systems and methodologies are described that facilitate providing quality of service (QOS) functionality on a host device or tethered processor to conserve resources on a network device. In particular, the host device/tethered processor can classify QOS data and manage QOS flows, transmitting data by flow to the network device. The data from the QOS flows can be tagged to identify the flow and/or characteristics thereof allowing the wireless device to simply route the data to its respective flow. Thus, the network device is saved from such classification and flow management freeing resources to provide increased performance and decreased power consumption.

59 Claims, 14 Drawing Sheets

(51) Int. Cl.
*H04L 12/833* (2013.01)
*H04W 28/16* (2009.01)
*H04L 29/08* (2006.01)

(52) U.S. Cl.
CPC ............ *H04W 28/16* (2013.01); *H04L 67/322* (2013.01); *Y02B 60/50* (2013.01)

(56) References Cited

U.S. PATENT DOCUMENTS

| | | | | |
|---|---|---|---|---|
| 7,023,825 | B1* | 4/2006 | Haumont et al. | 370/338 |
| 2003/0064681 | A1* | 4/2003 | Uedo | 455/3.06 |
| 2003/0198204 | A1* | 10/2003 | Taneja et al. | 370/332 |
| 2003/0202469 | A1* | 10/2003 | Cain | 370/230 |
| 2004/0109459 | A1* | 6/2004 | Madour et al. | 370/401 |
| 2004/0213150 | A1* | 10/2004 | Krause et al. | 370/229 |
| 2006/0218302 | A1* | 9/2006 | Chia et al. | 709/245 |
| 2006/0274706 | A1* | 12/2006 | Chen et al. | 370/340 |
| 2007/0014259 | A1* | 1/2007 | Fajardo et al. | 370/331 |
| 2007/0111698 | A1* | 5/2007 | Mysore et al. | 455/338 |
| 2007/0121580 | A1* | 5/2007 | Forte et al. | 370/351 |
| 2007/0165565 | A1 | 7/2007 | Jung et al. | |
| 2007/0280105 | A1* | 12/2007 | Barkay et al. | 370/229 |
| 2008/0101231 | A1* | 5/2008 | Lai et al. | 370/235 |
| 2008/0123660 | A1* | 5/2008 | Sammour et al. | 370/395.21 |

FOREIGN PATENT DOCUMENTS

| | | |
|---|---|---|
| EP | 1372306 A2 | 12/2003 |
| JP | 2001308914 A | 11/2001 |
| JP | 2006067090 A | 3/2006 |
| JP | 2006514510 A | 4/2006 |
| JP | 2007028653 A | 2/2007 |
| JP | 2007517453 A | 6/2007 |
| JP | 2007189661 A | 7/2007 |
| JP | 2008505530 A | 2/2008 |
| WO | WO2005060357 | 7/2005 |
| WO | 2006004471 A1 | 1/2006 |

OTHER PUBLICATIONS

Taiwan Search Report—TW097134269—TIPO—Mar. 5, 2012.

* cited by examiner

HOST-BASED QUALITY OF SERVICE FOR WIRELESS COMMUNICATIONS

CROSS-REFERENCE TO RELATED APPLICATIONS

This application claims the benefit of U.S. Provisional Patent application Ser. No. 60/970,921 entitled "METHODS AND APPARATUSES FOR PROVIDING QUALITY OF SERVICE TO A TETHERED PROCESSOR THROUGH A WIRELESS DEVICE" which was filed Sep. 7, 2007. The entirety of the aforementioned application is herein incorporated by reference.

BACKGROUND

I. Field

The following description relates generally to wireless communications, and more particularly to providing quality of service (QOS) for wireless communication applications.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. Mobile device can provide quality of service (QOS) to applications such that wireless network bandwidth and/or resources can be guaranteed for the requesting applications. QOS can be used to prioritize data packets based on the application; for example, a streaming application on the mobile device can be provided a high QOS due to required data rate to ensure quality of the stream whereas a file transfer can be assigned a lower QOS. In addition, mobile devices can be utilized to provide host devices and/or tethered processors with mobile access. To this end, the host devices and/or tethered processors can execute applications providing mobile access thereto via the mobile device.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating quality of service (QOS) classification and flow management for wireless communication applications using a driver or other device related to a host device or tethered processor. For example, the host device or tethered processor can execute a driver to offload QOS processing from an associated network device saving resources of the network device, which results in increased resource (e.g., processor and memory) availability, decreased power consumption, etc. on the network device. It is to be appreciated that this can provide increased throughput or lower latency for more efficient QOS. Additionally in this regard, the network device can operate in conjunction with the driver to provide QOS access to a wireless network to which the network device is connected and receives wireless access. Thus, the host or tethered processor based driver provides end-to-end QOS to its applications by managing classification and queuing for QOS while leveraging the network device to provide QOS over the wireless network.

According to related aspects, a method for providing QOS to one or more applications in a wireless communications network is provided. The method can comprise classifying data received from an application in one or more local QOS flows related to the application. The method can also include tagging the data with an identifier related to the one or more local QOS flows and transmitting the tagged data from the one or more local QOS flows to a wireless device for transmission over a wireless network Another aspect relates to a wireless communications apparatus. The wireless communications apparatus can include at least one processor configured to create one or more local QOS flows for an application based at least in part on QOS flow information received from a wireless device and filter data received from the application to the one or more local QOS flows. The at least one processor is further configured to tag data in the one or more local QOS flows with at least a portion of the QOS flow information and transmit the tagged data from the one or more local QOS flows to the wireless device. The wireless communications apparatus can also include a memory coupled to the at least one processor.

Yet another aspect relates to a wireless communications apparatus that facilitates host-based QOS classification and flow control in wireless communications. The wireless communications apparatus can comprise means for initializing at least one local QOS flow for an application and means for associating data received from the application with at least a portion of QOS flow information received from a wireless device. The wireless communications apparatus can additionally include means for classifying the data into the local QOS flow for transmission to the wireless device.

Still another aspect relates to a computer program product, which can have a computer-readable medium including code for causing at least one computer to classify data received from an application in one or more local QOS flows related to the application. The computer-readable medium can also comprise code for causing the at least one computer to tag the data with an identifier related to the one or more local QOS flows. Moreover, the computer-readable medium can comprise code for causing the at least one computer to transmit the tagged data from the one or more local QOS flows to a wireless device for transmission over a wireless network.

According to a further aspect, a method for providing QOS for a host device or tethered processor in wireless communications is provided. The method can include receiving application data from a host device for QOS transmission in a wireless network. The method can further include extracting a tag from the application data to determine a respective QOS flow for transmission as well as transmitting the data to the wireless network according to a requested QOS from the host device using the respective QOS flow.

Another aspect relates to a wireless communications apparatus. The wireless communications apparatus can include at least one processor configured to determine respective QOS flow information appended to application data received from a host device. The at least one processor is further configured to remove the appended information from the application data and transmit the application data to a wireless network over a QOS flow based on the respective QOS flow information. The wireless communications apparatus can also include a memory coupled to the at least one processor.

Yet another aspect relates to a wireless communications apparatus for providing wireless network QOS for host-based QOS managed applications. The wireless communications apparatus can comprise means for determining QOS flow information associated with application data from a host device. The wireless communications apparatus can additionally include means for transmitting the application data to a wireless network over at least one QOS flow selected based at least in part on the QOS flow information.

Still another aspect relates to a computer program product, which can have a computer-readable medium including code for causing at least one computer to receive application data from a host device for QOS transmission in a wireless network. The computer-readable medium can also comprise code for causing the at least one computer to extract a tag from the application data to determine a respective QOS flow for transmission. Moreover, the computer-readable medium can comprise code for causing the at least one computer to transmit the data to the wireless network according to a requested QOS from the host device using the respective QOS flow.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
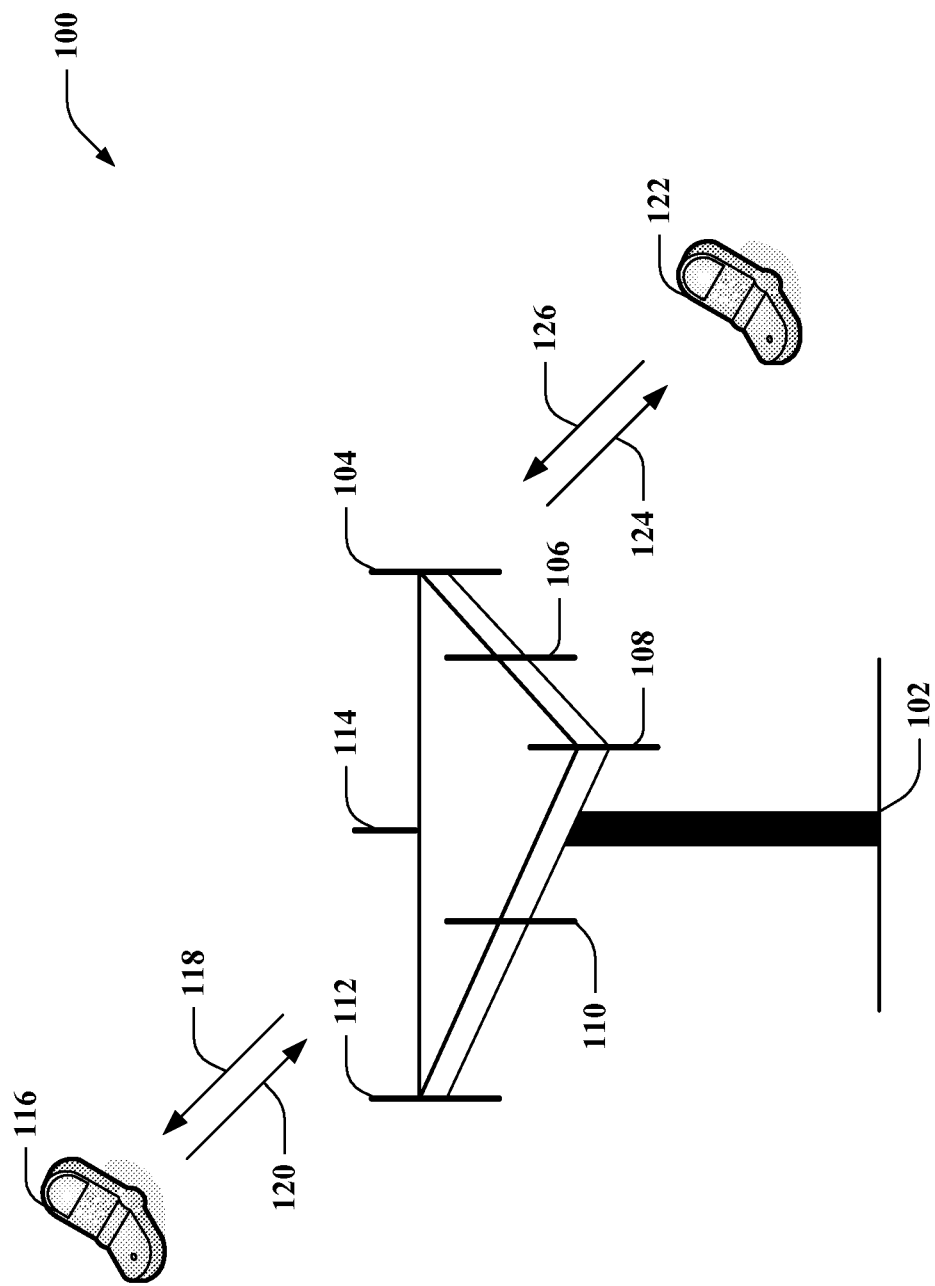
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. In one example, one or more of the mobile devices 116/122 can be a host device or tethered processor having a network device to connect to an internet protocol (IP) and/or wireless network. A tethered processor, with respect to a network device, is a processor independent of the network device to which the network device associates to provide network services. For example, the tethered processor can execute additional applications and/or associate with additional devices. In this regard, the tethered processor can be a laptop, which can be associated with an integrated or attached network device having its own processor/integrated circuit (IC); likewise, the tethered processor can refer to a main processor of a mobile device, such as a smart phone and/or the like, having a network device with an independent processor/

IC for example. Additionally, a device embodying or associated with the tethered processor can be referred herein as the host device and/or tethered device. In any case, the tethered processor/host device/tethered device can be more powerful and have greater memory capacity than the processor/memory of the network device.

According to an example, the network device (e.g., wireless device) associated with the mobile devices 116/122, such as a network modem or transmitter, can provide quality of service (QOS) to applications on the mobile devices 116/122. QOS can refer to providing varying levels of data throughput/lower latency for the applications according to available network resources. For example, QOS can be utilized to prioritize data packets for applications such that some applications can transmit data packets at a rate faster than others. For example, a streaming application, such as voice over IP (VOIP), streaming audio/video, etc. can demand better QOS (e.g., higher data throughput and/or lower data latency) for proper utilization than a file transfer. Where communication resources are limited, streaming applications generally benefit greater from higher QOS than file transfer due to the real-time requirement needed to effectuate the application.

However, providing QOS requires classifying transmit and/or reverse link application data packets as well as flow management for the packets, demanding processor cycles and memory. Thus, the tethered processors related to the network devices, e.g., the mobile devices 116/122 and/or host devices connected thereto, depending on the configuration, can implement the QOS classification and flow management. In one example, the tethered processor and/or host device can bear much of the processing and memory load associated with QOS in this regard and can leverage the network device to provide QOS over the wireless network (e.g., in communication with the base station 102). Since the classification and flow management are performed on the host device/tethered processor (e.g., mobile device 116/122), the network device thereof or associated therewith (e.g., transmitter or modem) need only provide a minimal level of QOS flow control, while providing flow control and filtering parameters to the host device/tethered processor. Pushing buffering and other functionalities to the host device/tethered processor provides reduced processing power and memory consumption on the network device. This can, in turn, increase efficiency and QOS throughput with respect to the network device.

Figure 2:
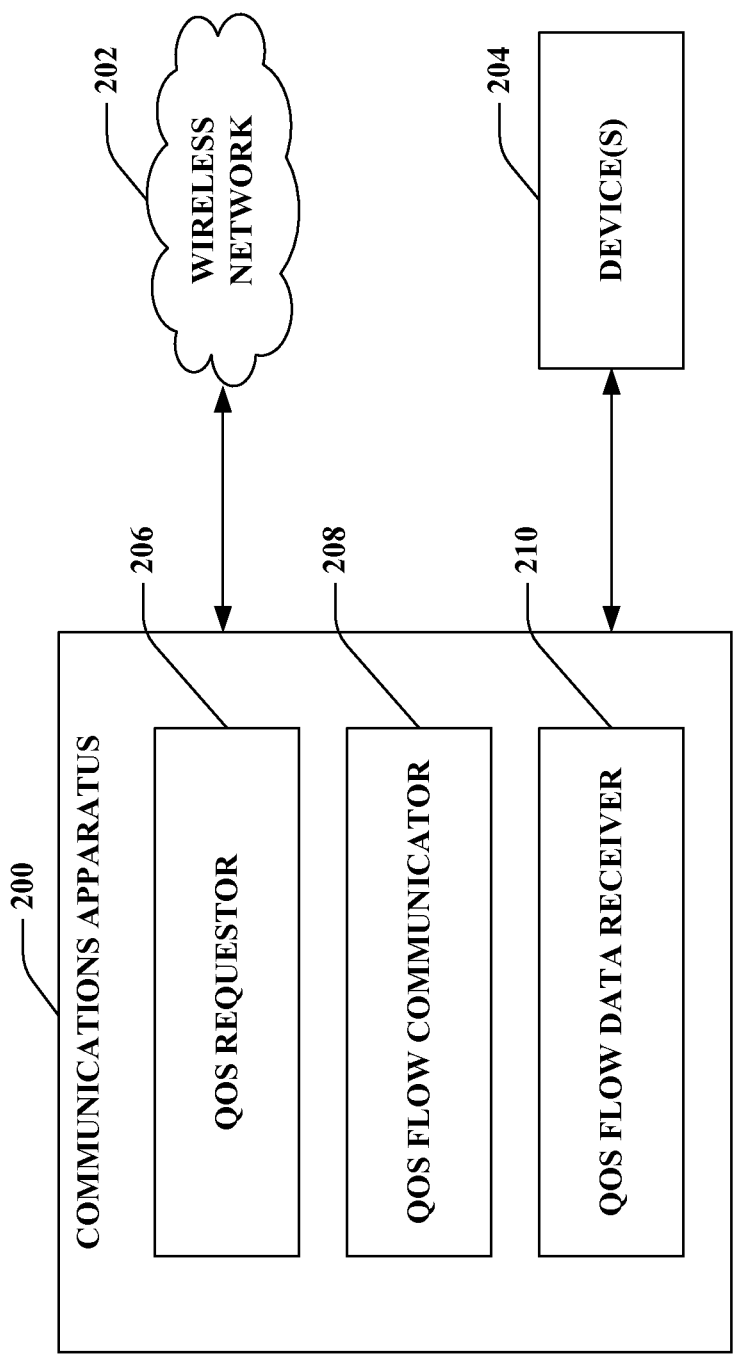
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives and/or transmits data in a wireless communications environment. The communications apparatus 200 can communicate with a wireless network 202 to receive access thereto for communication with one or more disparate devices (not shown) within the wireless network 202. Additionally, the communications apparatus 200 can communicate with one or more device(s) 204 providing the wireless access to the device(s) 204. The communications apparatus 200 can include a QOS requestor 206 that negotiates QOS with the wireless network 202 for one or more applications executing on the device(s) 204, a QOS flow communicator 208 that transmits negotiated QOS flow information to the one or more devices 204, and a QOS flow data receiver 210 that receives data to transmit over the negotiated QOS flow(s).

In one example, the QOS requestor 206 can establish one or more QOS flows with the wireless network 202; this can be achieved through signaling a base station or other network access point (not shown). The QOS flow can be related to an application executing on one or more device(s) 204 and can provide a level of service as described, including guaranteed resources, throughput, etc. In another example, the wireless network 202 can autonomously establish QOS (e.g., based on predefined configuration). The wireless network 202 can provide QOS flow and filter parameters to the communications apparatus 200. The QOS flow communicator 208 can transmit QOS flow information to the device(s) 204 allowing the device(s) 204 to utilize the QOS flow; the flow information can include one or more identifiers related to the QOS flow, capabilities, flow parameters (such as data rates, latency, minimum packet size, error rate, etc.), filter parameters (such as source address, destination address, protocol, port numbers, etc.), and/or guaranteed resources for the QOS flow, etc. It is to be appreciated that in the previous example, where the wireless network 202 autonomously establishes QOS, the communications apparatus 200 can still transmit QOS information to the device(s) 204 though the device(s) 204 did not request establishment of the QOS.

The QOS flow data receiver 210 can receive application data from the device(s) 204 for transmission over the QOS flow. In the case of multiple flows, the application data can include the one or more flow identifiers, which can be tagged on or otherwise associated with the application data, to allow the communications apparatus 200 to match the data with the appropriate QOS flow for transmission on the QOS flow. Thus, significant portions of QOS flow mechanisms can be performed external to the communications apparatus 200, such as on the device(s) 204. The communications apparatus 200 can effectuate QOS flow usage by extracting the appropriate flow identifier from application data allowing the device(s) 204 to handle QOS operations.

According to an example, the device(s) 204 can be a host device and/or a tethered processor, which can be more powerful and/or have more resources as compared to the communications apparatus 200. Thus, off-loading QOS processing to the device(s) 204 can save the communication apparatus 200 processing power and memory consumption, which can result in more efficient access and/or QOS performance, as mentioned. To this end, the device(s) 204 can execute applications providing QOS to the applications via communications apparatus 200. The device(s) 204 can signal to the communications apparatus 200 to receive QOS for one or more applications, causing the QOS requester 206 to negotiate the QOS with the wireless network. The QOS flow communicator 208 can transmit flow information to the device(s) 204, such as a unique flow identifier, flow parameters, filter parameters, etc.

The device(s) 204 can include the identifier in subsequent application data and can transmit the data to the communications apparatus 200 to provide QOS to the application. The device(s) 204 can utilize the information, such as the flow and/or filter parameters to provide QOS processing relieving the communications apparatus 200. For example, the QOS flow communicator 208 can transfer parameters such as a flow state (e.g., active, added, modified, deleted, suspended, etc.), flow priority, flow ID, filter parameters including source addresses, destination addresses, protocol types, service types, and/or the like to the device(s) 204. The device(s) 204 can then utilize the parameters in providing QOS, such as associating application data with its appropriate local QOS flow based on the unique identifier (e.g., flow ID) and/or one or more of the mentioned filter parameters, to ensure the data is transmitted over the appropriate local QOS flow.

Upon transmission, the QOS flow data receiver 210 can receive the application data, identify the QOS flow by the unique identifier transmitted therewith, and include the data on the appropriate QOS flow negotiated with the wireless network 202. The QOS flow data receiver 210 can utilize the appropriate QOS flow to transmit the application data according to the requested QOS scheme. For example, the application can request a level of QOS to provide priority for transmitting data from the application. This allows the application to achieve a level of service desired and/or required to execute. Thus, as described, different types of applications can request and receive varying levels of QOS. The device(s) 204 can apply QOS to application data classifying it to the appropriate QOS flow and transmitting it with an identifier, and the QOS flow data receiver 210 can apply the requested level of QOS upon receiving the data based on the identifier, for example. In this regard, end-to-end wireless network QOS is provided to applications on the device(s) 204 by utilizing the device(s) 204 and the communications apparatus 200.

Figure 3:
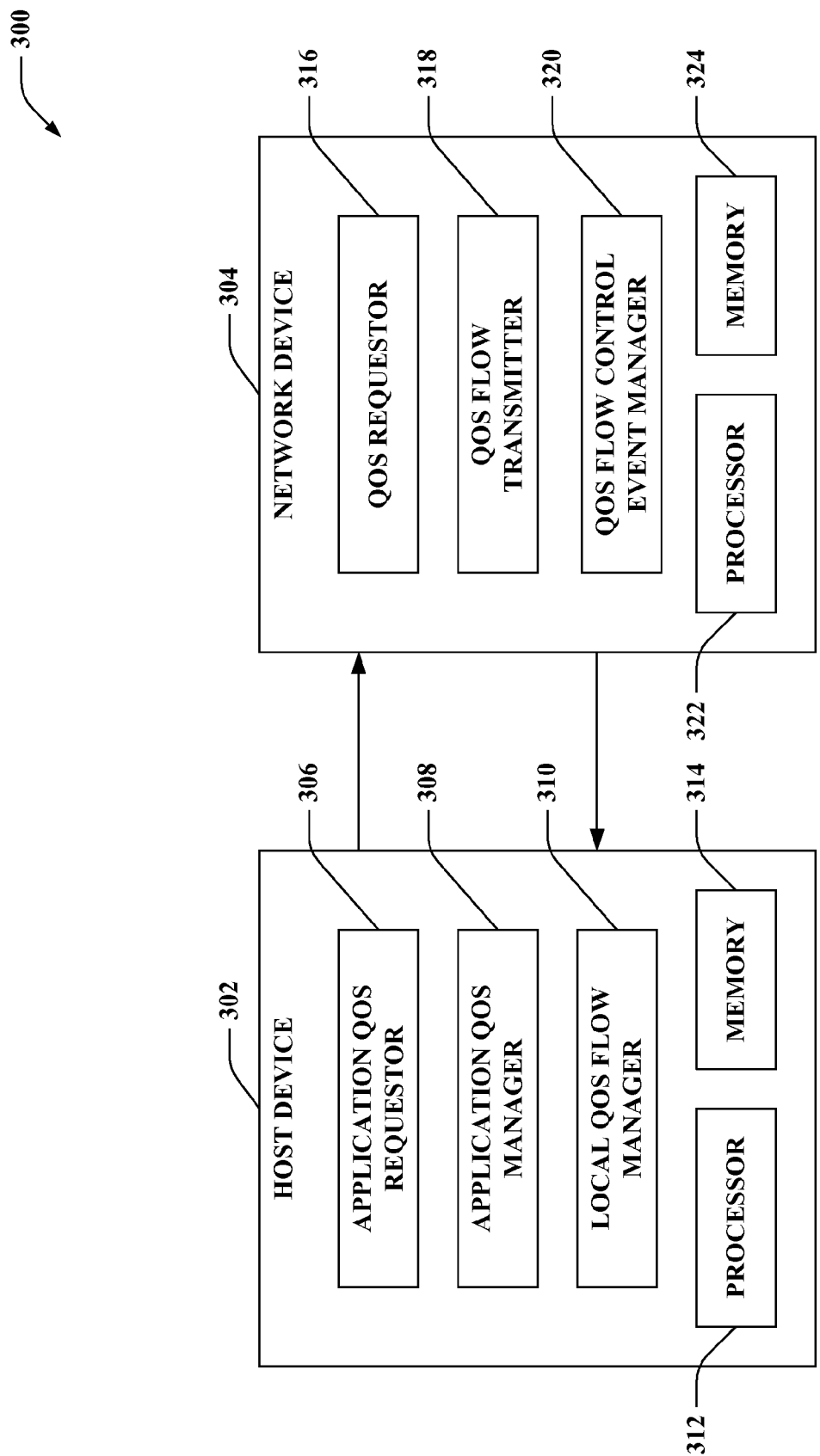
FIG. 3 is an illustration of an example wireless communications system that effectuates host-based QOS classification and flow management.

Now referring to FIG. 3, illustrated is a wireless communications system 300 that can manage application QOS classification and flow at a host device. The host device 302 can be a base station, mobile device, laptop, smart phone, and/or portion thereof. The network device 304 can be a network transmitter associated with the host device 302 providing wireless network access thereto; the network device 304 can also be a mobile device, laptop, smart phone, and/or portion thereof, a network radio, transceiver, etc. In one example, host device 302 can utilize the network device 304 to transmit information over a reverse link or uplink channel to one or more disparate network entities (not shown); further host device 302 can utilize the network device 304 to receive information from a network (not shown) over a forward link or downlink channel. The network device 304 can be wired, wireless, etc. with respect to the network. Moreover, system 300 can be a MIMO system as described. Also, the components and functionalities shown and described below in the host device 302 can be present in the wireless device 304 as well and vice versa. For example, a device (not shown) can comprise both the host device 302 and the network device 304, such as a smart phone. Also, the network device 304, and thus host device 302 in most cases, can be mobile such that it can move between networks, some of which may not be QOS enabled.

Host device 302 can utilize the network device 304 to communicate with a network, such as to provide QOS to one or more applications executing on the host device 302. The host device 302 can include an application QOS requester 306 that can query the network device 304 for QOS on behalf of one or more applications, an application QOS manager 308 that can create and classify data flows for the application(s), and a local QOS flow manager 310 that can manage one or more local QOS flows and transmit data thereon to the network device 304 to provide network access to the application (s). The local QOS flows can be flows created by local QOS flow manager 310 that relate to one or more QOS flows on the network device 304 as described herein. In particular, the local QOS flow can receive data and transmit the data over a related QOS flow on the network device 304. Offloading QOS flow processing to the host device 302 can conserve resources on the network device 304 in one example.

The host device 302 can also comprise a processor 312 and memory 314 that can be utilized by the QOS requester 306, application QOS manager 308 and/or the local QOS flow manager 310 for providing functionality described herein. In one example, an application (not shown) executing on the processor 312 of the host device 302 can request QOS. As described, the application can require a higher throughput or lower latency than other applications where bandwidth of the network can be limited. In one example, a streaming application, such as VOIP or other streaming, can require lower latency for proper functionality than a file transfer application as described. The application QOS requester 306 can request QOS from the network device 304 on behalf of the application. In addition, the application QOS manager 308 can create one or more local QOS flows with classification capabilities for the application to locally manage QOS. The local QOS flow manager 310 can transmit QOS flow data to the network device 304 for propagation to the network.

The network device 304 can receive QOS flow data from the host device 302 for transmission over the network using QOS. The network device 304 can comprise a QOS requester 316 that can negotiate QOS with a network on behalf of an application executing on the host device 302 and transmit information regarding the QOS to the host device 302, a QOS flow transmitter 318 that can send data received by the host device 302 over the QOS flow appropriate for a specified application, and a QOS flow control event manager 320 that can determine and transmit QOS flow status and/or events to the host device 302. Moreover, the network device can comprise a processor 322 and memory 324 that can be utilized by the QOS requestor 316, QOS flow transmitter 318, and/or QOS flow control event manager 320 to perform functionalities described herein. According to an example, the host device 302 can manage QOS classification and flows for applications executing thereon. In so doing, the application QOS requester 306 can request establishment of QOS for one or more applications; in response, the QOS requestor 316 can negotiate one or more QOS flows with the network and provide the host device 302 with information regarding the established QOS flows, such as one or more QOS flow identifiers, capabilities, flow/filter settings as described, etc.

The application QOS manager 308 can receive the QOS flow information and utilize such in establishing local QOS flows and classification therefor. For example, for a given QOS flow, the application QOS manager 308 can create one or more corresponding local QOS flows and/or related queues for the application according to the received QOS flow information. In addition, the application QOS manager 308 can utilize filter parameters to appropriately filter application data to its respective local QOS flow. For example, the filter parameters can include source address, destination address, protocol, and/or the like. Also, the application QOS manager 308 can associate flow parameters, such as an identifier with the local QOS flow. Upon receiving data to be transmitted by the application to the network via network device 304, the application QOS manager 308 can filter the data classifying it to an appropriate local QOS flow. Once in the local QOS flow, the application QOS manager 308 can associate the respective QOS flow identifier with the application data. This can be done by tagging the data, in one example, with the QOS flow identifier for subsequent determination of the appropriate QOS flow. It is to be appreciated that the tagging can be performed using existing technology (e.g., IP type of service (TOS), IEEE 802.3p/q) and/or by defining a header compatible with both the host device 302 and the network device 304. Defining a header, in an example, can provide one-to-one mapping to flows allowing the QOS transmitter 318 to simply strip the header and transmit the data in the QOS flow, or more simply, transmit a pointer beyond the header.

In the above example, the local QOS flow manager 310 can transmit data in the local QOS flows to the network device 304 according to a related QOS scheme, e.g., the QOS requested by the application and/or a QOS available according to available resources and bandwidth. Upon receiving the data in the local QOS flows from the host device 302, the QOS transmitter 318 can schedule and transmit the data according to its QOS scheme, which can match that utilized by the host device 302. However, the network device 304 need not receive data directly from the applications or fully classify it, as this is performed at the host device 302. Moreover, the application QOS manager 308 can differentiate between application traffic having associated local QOS flows and mere best efforts traffic not associated with a given local QOS flow. Thus, the application QOS manager can additionally indicate best efforts traffic (e.g., by tagging as such or not tagging as QOS data) and transmit such to an appropriate best efforts flow, scheduling the traffic among other best efforts applications. The QOS flow transmitter 318, upon receiving data traffic in the QOS flow, can transmit such to the network in a best efforts manner; thus, this additional classification/ queuing load can be performed on the host device 302 freeing network device 304 resources. This can be beneficial as the processor 312 of the host device 302 can be more powerful than the processor 322 of the network device 304. Moreover, the memory 314 of the host device 302 can have greater capacity than the memory 324 of the network device 304.

In addition, QOS flows can be controlled in networks (e.g., wireless networks) for a variety of reasons, including network determination based on availability of resources, signal strength, moving out of a QOS-enabled network, and/or the like. Thus, QOS flows can be reduced or suspended such that data transmitted to the QOS flows are not immediately sent; in this regard, the data can be queued and/or dropped if an expiration time has passed, for example. Upon a QOS flow control event, the QOS flow control event manager 320 can transmit or return a QOS flow control event or status to the host device 302. Such events can indicate that the QOS flow is enabled, disabled, active, suspended, etc. The events are referred to herein as flow events, flow status or state (which can relate to a value of the last flow event received), or specifically as flow enabled, flow disabled, flow activated, flow suspended, and/or the like. Moreover, the events can be an enumeration or other data structure, such as an integer value, a Boolean value (e.g., flow enabled=false indicates the flow is disabled and flow enabled=true indicates that the flow is enabled). Additionally, the flow events can refer to those events received for the QOS flow by the network device 304 and/or events transmitted by the network device 304 to the host device 302 related to the local QOS flow on the host device 302. Upon receipt of the QOS flow control event, the local QOS flow manager 310 can set a local status for the respective local QOS flow. For example, the local QOS flow manager 310 can begin queuing traffic locally where a suspended or reduced bandwidth event/status is received from the QOS flow control event manager 320. Accordingly, where a subsequent normal QOS flow status/event is received, the local QOS flow manager 310 can begin transmitting the traffic in the queue to the network device 304 according to the specified QOS (or at an increased rate to catch up to an end-receiver of the data, for instance).

In one example, where the network device 304 receives a QOS flow suspended status from the network, it can first determine whether traffic related to the QOS flow can be properly transmitted over a best efforts flow. If so, the QOS flow control event manager 320 need not transmit the QOS flow event to the host device, and the QOS flow transmitter 318 can redirect the traffic for the controlled QOS flow to its best efforts flow. Likewise, if the suspended QOS flow becomes active at the network, the QOS flow transmitter 318 can redirect traffic to the original QOS flow without having to notify the host device 302 of the change. It is to be appreciated that this can save logic and complexity from host device 302 implementation.

However, if the best efforts flow becomes controlled in this example, the QOS flow control event manager 320 can report flow disabled for the QOS flow to the host device 302 at that time, and the application QOS manager 308 can begin queuing QOS flow traffic for the local QOS flow, as described. Similarly, once the best efforts flow or the controlled QOS flow returns to a normal uncontrolled flow, the QOS flow control event manager 320 can notify the host device 302 of QOS flow enabled. If, however in the previous example, the best efforts flow cannot be utilized to effectively transmit the application data, the QOS flow control event manager 320 can notify the host device 302, and the application QOS manager 308 can begin queuing local QOS flow data, as described. It is to be appreciated that the network device 304 can control host device 302 flows using the QOS flow control event manager 320 as described regardless of its flow status with the network.

In addition, utilizing the network device 304 can hide other intricacies from the host device 302 to ease implementation of the host device 302. For example, the network device 304 can communicate with the network using logical link channels (e.g., as in advanced mobile subscriber software (AMSS) software), which can be flow controlled. In this regard as well, the network device 304 can communicate a single state for a given QOS flow to the host device though other entities are considered for network flow communication (e.g., status of the QOS flow, best efforts flow, and logical link layer). Thus, the host device 302 need not determine flow control states for substantially all lower layers, rather the network device 304 can report a single state based on states of a plurality of relevant layers. For example, if the logical link channels are flow controlled, the QOS flow control event manager 320 can transmit an event or status for the affected QOS flows even though the QOS flows themselves are not actually controlled. In another example, when a QOS flow is released from the network, deleted, or otherwise disabled, for example, the QOS flow control event manager 320 can transmit an event to the host device 302. This can occur, for example, when QOS is no longer available (e.g., the network no longer supports such), when the application is preempted by a higher priority application requiring QOS, and/or similar host device 302, network device 304, or network based determinations. The QOS application manager 308 can subsequently classify remaining data in a best efforts queue; however, because the remaining data may have been delayed longer than best efforts data, the QOS application manager 308 can intersperse the data of the deleted QOS flow in the best efforts queue with some priority, in one example. The priority can include interspersing by time stamp and/or based on the QOS scheme previously utilized, for example.

According to one example configuration, the host device 302 can be a laptop having a third generation (3G) modem as the network device 304. In this regard, the laptop can execute a plurality of wireless applications, such as a VOIP application and a file management application, for example. The 3G modem can communicate with a wireless network to provide access thereto, which can have limited bandwidth. Thus, QOS can provide advantage for the applications to ration available bandwidth according to the needs of the applications. For instance, the VOIP application can demand a higher QOS due to its real time data transfer requirements to provide effective service. Thus, the VOIP application can request QOS, and the application QOS requestor 306 can establish QOS with the wireless network via the QOS requestor 316 of the 3G modem.

The QOS requestor 316 of the 3G modem negotiates QOS with the wireless network through signaling and/or the like and can receive one or more QOS flows for the VOIP application. The 3G modem 304 can transmit information regarding the one or more QOS flows to the laptop, such as filtering information and/or an identifier for each of the flows, for example. The application QOS manager 308 can create local QOS flows corresponding to the one or more QOS flows, which can be managed locally by the laptop. In addition, the laptop can have a flow for best efforts data. VOIP traffic can be classified in the one or more of the local QOS flows related to the VOIP application where a tag can be attached or otherwise associated with the data identifying the appropriate QOS flow or priority of the data, while data for file management can be classified in the best efforts flow with an identifier (or lack thereof) related to the best efforts flow. The local QOS flow manager 310 can transmit the VOIP data over the appropriate flows to the 3G modem and the file management data over the best efforts flow. In another example, the local QOS flow manager 310 can transmit all data over a single data flow allowing the QOS flow transmitter 318 to identify data based on the tag and appropriately transmit the data over its respective flow.

As described, if the VOIP flow becomes controlled, the QOS flow transmitter 318 of the 3G modem can transmit the VOIP packets in the best efforts flow if such will render requisite quality as promised by the requested QOS. If, however, this is not attainable or the best efforts flow is controlled as well, the QOS flow control event manager 320 can transmit a QOS flow disabled status to the laptop. Using this information, the laptop can queue data to be transmitted over the local QOS flow for the VOIP application until the related QOS flow of the 3G modem becomes enabled. At the 3G modem end, this may be when the best efforts flow becomes uncontrolled as described above; regardless, the 3G modem can transmit a QOS flow enabled indicator to the laptop to indicate establishment of the QOS flow. It is to be appreciated that the host device 302 can be a number of devices or processors/ICs as described. In addition, the host device 302 can be implemented at least in part by software on such device (e.g., a driver or other service) and/or can be implemented at least in part as a disparate device in communication with the host device 302, or software associated with the disparate device.

Figure 4:
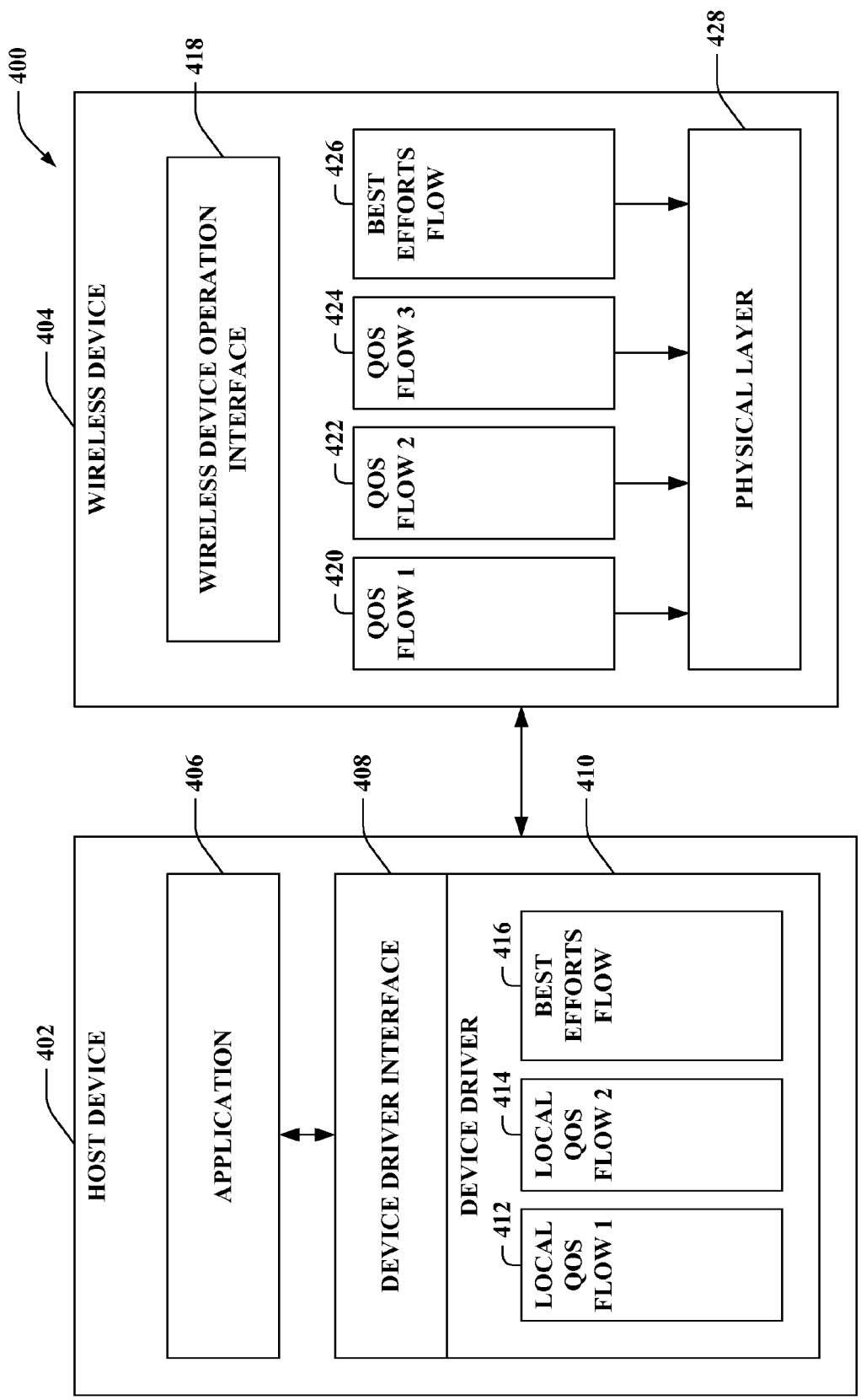
FIG. 4 is an illustration of an example wireless communication system that implements a driver for providing host-based QOS management.

Turning now to FIG. 4, illustrated is an example wireless communications network 400 that facilitates host-based application QOS classification and flow management. A host device 402 is provided, which as described can be a device that utilizes a wireless device 404 for wireless network access. In one example, the host device 402 can be a laptop, smart phone, etc. having a 3G or other network modem attached, which can be the wireless device 404, using some interface or bus, such as universal serial bus (USB), personal computer memory card international association (PCMCIA), circuit board, and/or the like; additionally, the interface can be software executing on the host device 402. The host device 402 can execute an application 406 that requests QOS over a wireless network. The host device 402 can also provide a device driver interface 408 that allows one or more applications 406 to communicate with device driver 410 to request QOS or otherwise utilize the wireless device 404. The device driver 410 has a plurality of local QOS flows 412 and 414, as well as a best efforts flow 416 for respectively transmitting QOS and/or best efforts data, as described herein. It is to be appreciated that more or less flows of either type can be provided, and flows can be established dynamically when applications request and/or are approved for given flows.

The wireless device 404 comprises a wireless device operation interface 418 that can be utilized to control and/or initialize one or more functions on the wireless device 404. Furthermore, a plurality of QOS flows 420, 422, and 424, as well as a best efforts flow 426 are provided, which are established for one or more given applications, such as application 406, upon request from the device driver 410. Thus, one or more of the QOS flows 420, 422, and 424 can relate to one or more of the local QOS flows 412 and 414, such that data from the host device 402 flows can be transmitted over the wireless device 404 flows as described supra. In addition, the device driver interface 408 can receive flow/filter parameters from the wireless device 404 and utilize such in classifying data into the local QOS flows 412 and 414, for example; the flow/filter parameters can relate to the respective QOS flow(s) 420, 422, and/or 424.

Data transmitted over the best efforts flow 416 of the host device 402 can similarly be transmitted on the best efforts flow 426 of the wireless device 404. Moreover, the wireless device 404 can comprise a physical layer 428, and/or a number of layers below the flows (not shown), which can be utilized to transmit data to a wireless network. According to an example, the application 406 can request QOS utilizing the device driver interface 408. This causes the device driver 410 to request QOS for the application from the wireless device 404. It is to be appreciated that this can occur using another interface to the wireless device 404, such as wireless device operation interface 418. The wireless device 404 can negotiate QOS over the physical layer 428 with the wireless network and can receive information for providing QOS, such as a flow identifier, filter settings, and/or the like as described previously.

The wireless device 404 can establish one or more QOS flows 420, 422, and/or 424 for the application. It is to be appreciated that at least one of the flows can be a best efforts flow 426 for general network traffic; in addition, one or more of the other QOS flows can be utilized for disparate applications, in one example. The wireless device 404 can subsequently transmit flow information related to one or more of the QOS flows 418, 420, and/or 422 to the device driver 410, which can include a flow identifier, filter settings, capabilities, and/or the like. The device driver 410 can establish one or more local QOS flows 412 and 414 for the application 406 and can pass flow utilization parameters to the application 406. The application 406 can begin transmitting QOS data using the device driver interface 408, which can signal the device driver 410. The device driver 410 can classify the QOS data in the appropriate local QOS flow 412 and/or 414, whichever was created for the application 406, for transmission to the wireless device 404. Moreover, where QOS is not requested for a given application, the device driver 410 can classify the data in the best efforts flow 416. Additionally, the device driver can tag data in a given local QOS flow 412 and/or 414, with appropriate tagging information such as an identifier received from the wireless device 404 to identify the proper QOS flow 420, 422 and/or 424.

Once transmitted, the wireless device 404 can receive the data, extract the tag to determine the proper QOS flow 420, 422, 424, and/or best efforts flow 426 for the data, and classify the data in the appropriate flow if the flow is enabled. Subsequently, the physical layer 428 can transmit flow data to the wireless network using the negotiated QOS scheme. In one example, as described, one or more of the QOS flows 420, 422, 424, and/or best efforts flow 424 can be controlled. This can occur where the device driver 410 is sending data too quickly for the flow to handle as determined by the wireless device 404 or the network, or where the device driver 410 is exceeding the promised QOS level, for example. In this case, the wireless device 404 can inform the device driver 410 of such, or can simply transmit flow data over a best efforts flow 426, as described above. However, if the best efforts flow becomes controlled or disabled, the wireless device 404 can notify the device driver 410, which can begin queuing data for the given flow. It is to be appreciated that by the time flow control notification is delivered to the wireless device 404, some data may be transmitted to the wireless device 404 from the host device 402. In this case, the wireless device 404 can queue the data, discard the data, and/or the like, for example.

Moreover, as described, a QOS flow 420, 422, and/or 424 can be released. This can occur where QOS is no longer available, such as where the wireless device 404 moves to a non-QOS enabled network, or one or more devices or applications take priority over the flow to receive a required QOS, for example. In addition, this can occur through a request by the application 406, device driver 410, wireless device 404, wireless network, etc. In this case, the wireless device 404 can transmit remaining flow data and/or data continuously received from the device driver 410 over its best efforts flow 426. If such transmission is effective to fulfill the requirements of the application 406, the wireless device 404 need not notify the driver 410 of the behavior. If, however, the best efforts flow 426 is insufficient to provide the desired or required QOS (or a QOS near such), the wireless device 404 can notify the device driver 410 that the respective QOS flow 420, 422, and/or 424 is disabled, and the device driver 410 can begin queuing data on its respective local QOS flow 412 and/or 414. Once the flow is enabled as described, the device driver 410 can resume transmitting the queued data over the local QOS flow 412 and/or 414.

Figure 5:
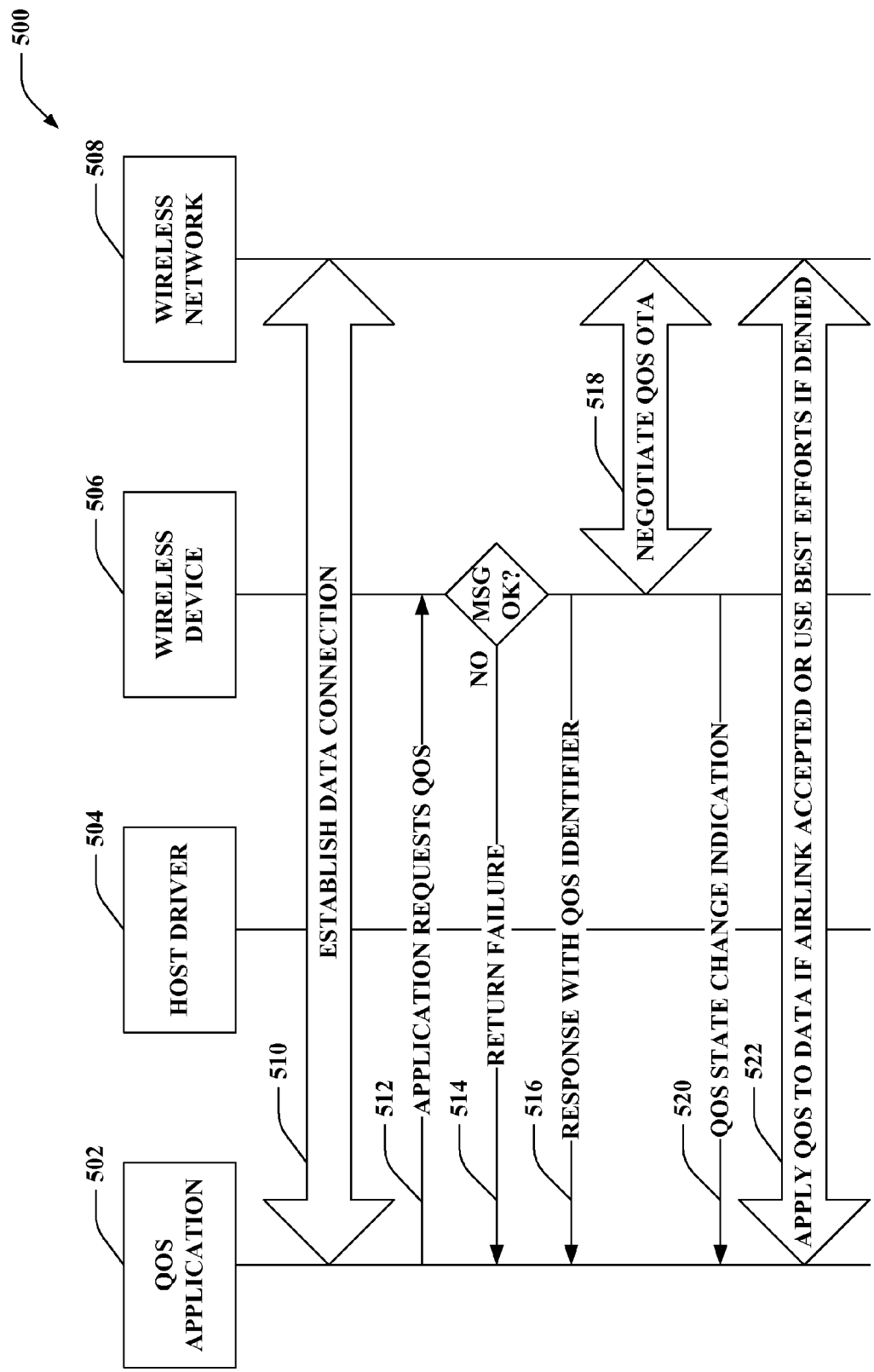
FIG. 5 is an illustration of an example wireless communication system displaying message passing for establishing QOS for an application.

Turning now to FIG. 5, a wireless communications system 500 is illustrated that facilitates establishing QOS for an application having access to a host driver. A QOS application 502 is provided, which can be substantially any application executing on a host device or tethered processor, as described, requiring a higher QOS than any other application executing thereon. Also, a host driver 504 is provided to enable host-based management of QOS classification and flow along with a wireless device 506 that is leveraged to communicate with a wireless network 508.

Initially, a data connection can be established between the QOS application 502 and the wireless network 508 using the host driver 504 and wireless device 506, as shown at 510 and described in reference to previous figures. Subsequently, the QOS application 502 can utilize the host driver 504 to request QOS from the wireless device 506, as shown at 512. If the message is malformed, the wireless device 506 can transmit such back to the QOS application 502 via the host driver 504, as shown at 514. Otherwise, at 516, the wireless device 506 can transmit a request validation to the QOS application 502 indicating the request was received and assigning a value to the requested QOS flow. It is to be appreciated that the application 502 can utilize the flow information to subsequently communicate data to the flow once the flow becomes enabled.

The wireless device 506 can subsequently negotiate QOS with the wireless network 508 over the air (OTA) at 518 as described. Once QOS is successfully negotiated, the wireless device 506 can update the status of the flow to indicate to the QOS application 502 that the flow is ready to receive data, as shown at 520. In the mean time, the QOS application 502 can have created its own flow that can apply an identification tag to data in the flow relating to the flow information previously received from the wireless device 506. This allows the QOS application 502 to apply QOS to the data as the wireless device 506 can differentiate the QOS data from other data based at least in part on the tag. Thus, QOS can be applied end-to-end from the QOS application 502 to the wireless network 508 if the airlink is accepted as shown as 522; otherwise, the wireless device 506 can transmit the data over a best efforts flow as described previously.

Figure 6:
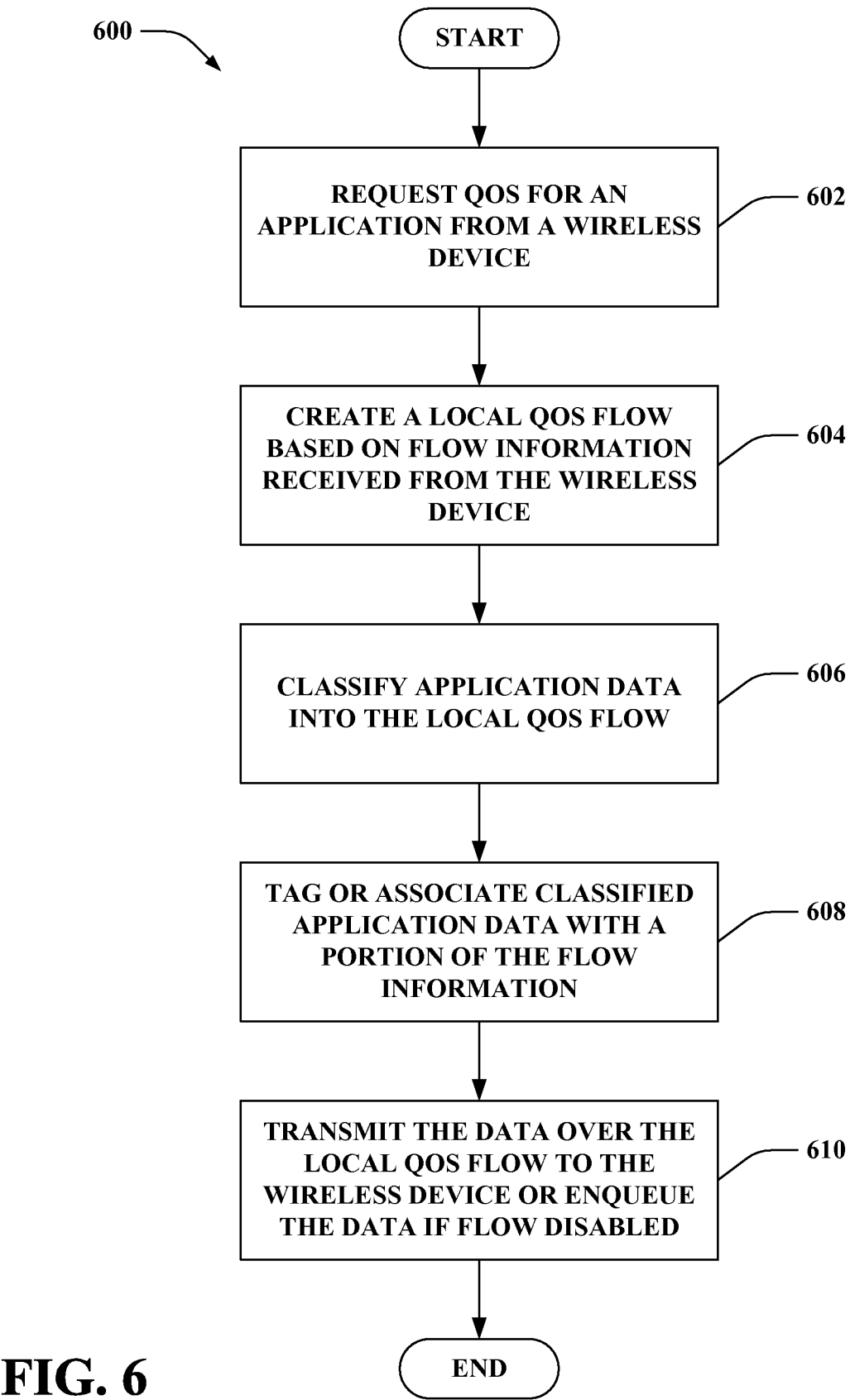
FIG. 6 is an illustration of an example methodology that facilitates initializing local QOS for an application.
Figure 7:
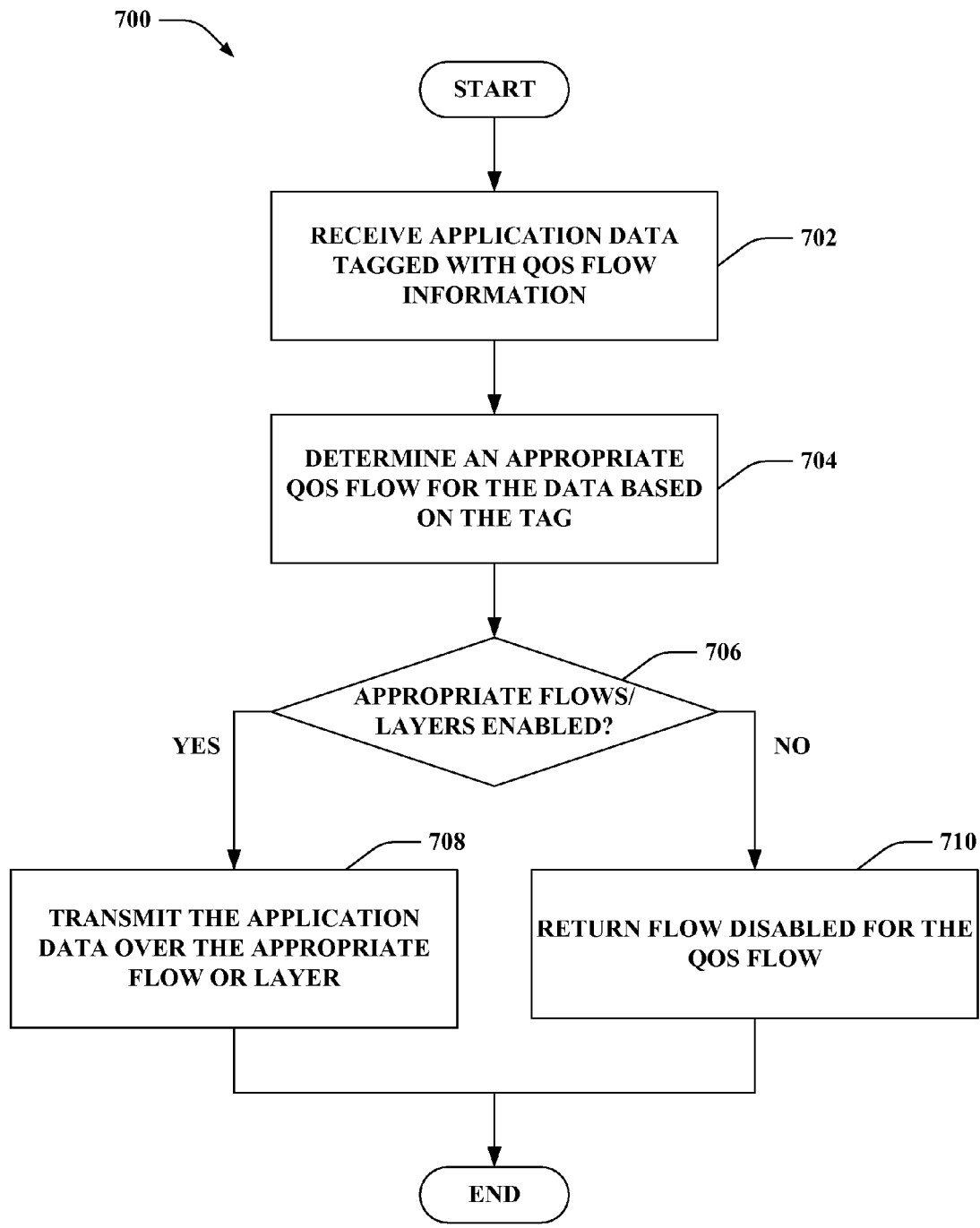
FIG. 7 is an illustration of an example methodology that facilitates negotiating QOS with a wireless network for an application.

Referring to FIGS. 6-7, methodologies relating to host or tethered processor based QOS flow management and classification are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, a methodology 600 that facilitates managing QOS classification and flow from a host device is displayed. At 602, QOS for an application can be requested from a wireless device. As described, the QOS can relate to guaranteeing resources to the application based at least in part on an application type or requirement for effective operation. The wireless device can request QOS from the wireless network, for example. At 604, a local QOS flow can be created for the application based on flow information received from the wireless device. Thus, for example, the wireless device can return information regarding its QOS flow allowing association of data classified in the local QOS flow with the QOS flow of the wireless device. At 606, application data can be classified into the local QOS flow for transmission to a wireless device. At 608, application data classified into the local QOS flow is tagged or otherwise associated with a portion of the flow information. As described, this can be a unique identifier, filter settings, capabilities, etc. and can subsequently identify an appropriate QOS flow on the wireless device. At 610, the data is transmitted over the local QOS flow to the wireless device or enqueued if the local QOS flow is disabled as described previously. The associated or tagged flow information allows the wireless device, in one example, to identify, and transmit the data over, its appropriate QOS flow.

Turning to FIG. 7, illustrated is a methodology 700 that transmits application data received from a host device using a requested QOS. At 702, application data tagged with QOS flow information is received. As described above, this can be received from a host device that tags the data related to one or more QOS flows for transmitting the data. At 704, an appropriate QOS flow for the data is determined based on the tag, which can comprise at least a portion of the flow information. The flow information can have been transmitted to the host device on a request for QOS; the host device can subsequently use the flow information, as described herein, to associate the data with the QOS flow. At 706, a determination is made as to whether the appropriate flows/layers are enabled. This can include not only the QOS flow, but lower communication layers, such as logical link channels. In addition, where the QOS flow is suspended or otherwise unavailable, the appropriate flows can include a best efforts flow as well, which if enabled can be utilized to transmit data while the QOS flow is suspended, as described. If the appropriate flow or layer is enabled, at 708, the application data can be transmitted over the flow or layer. If not, at 710, flow disabled can be returned for the QOS flow to indicate unavailability of the flow for transmitting the data, as described herein.

Figure 8:
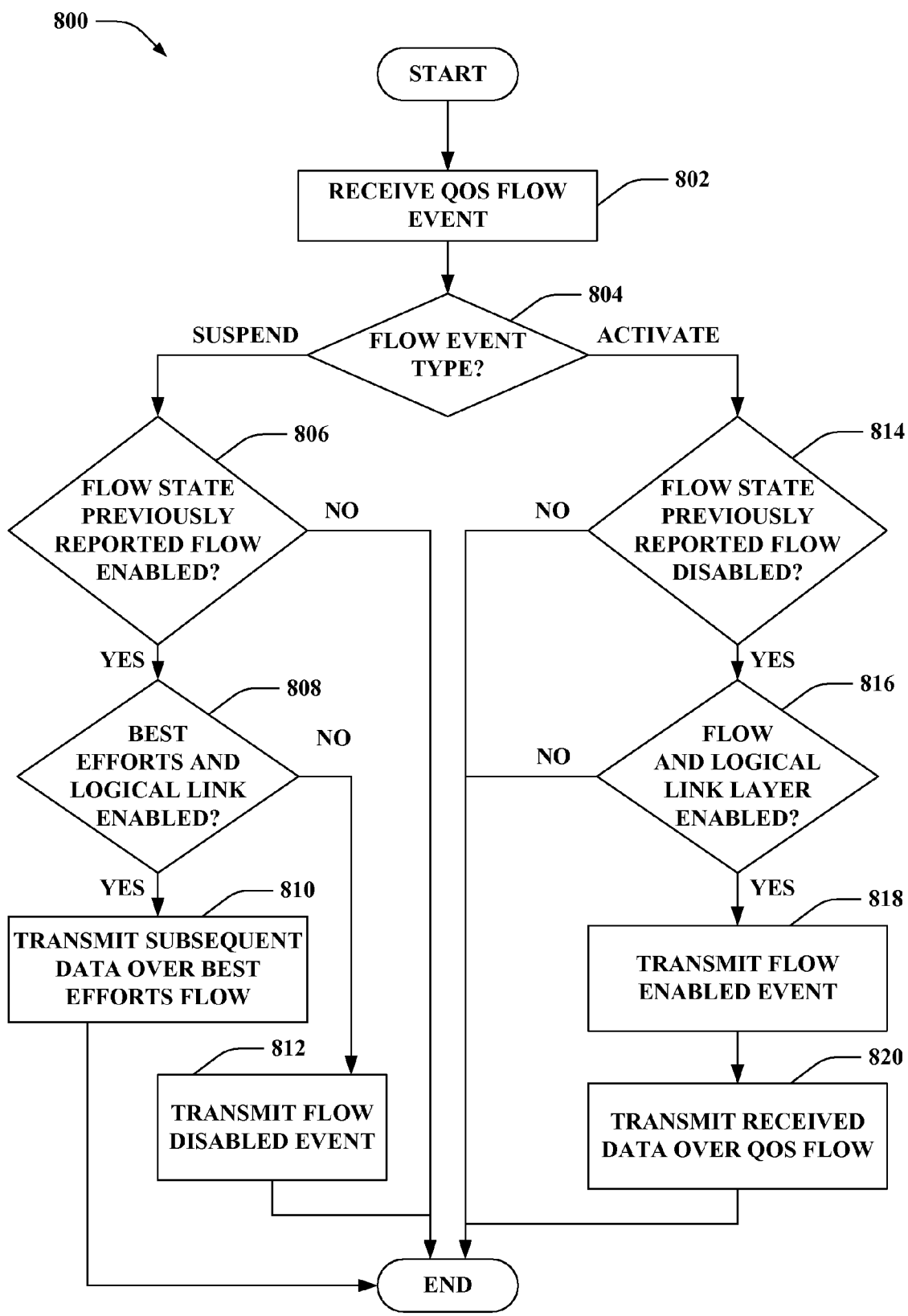
FIG. 8 is an illustration of an example methodology that facilitates handling flow suspend/active events.

FIG. 8 is an illustration of an example methodology 800 for handling QOS logical flow events. At 802, a QOS flow event is received; this can be an event to disable/enable the flow, for example. At 804, a flow event type is determined. If the flow event type is for suspending a QOS flow, at 806 it is determined if the QOS flow state previously reported was flow enabled. If so, then at 808 it is determined if the best efforts flow and logical link layer are flow enabled. If the best efforts flow is enabled, at 810 subsequent data is transmitted over the best efforts flow. If the best efforts flow is not enabled, then at 812 a flow disabled event is transmitted to indicate that the QOS flow is not active. If the QOS flow event type determined at 804 is for activating a QOS flow, then at 814 it is determined whether the QOS flow state previously reported was flow disabled. If so, then at 816 it is determined whether the flow and logical link layer related to the QOS flow are enabled. If so, then at 818 a flow enabled event is transmitted to indicate the QOS flow is now active, and at 820 received data is transmitted over the newly activated QOS flow. It is to be appreciated that other methods of suspending/activating flows are possible; this is one example of such a method as described herein.

Figure 9:
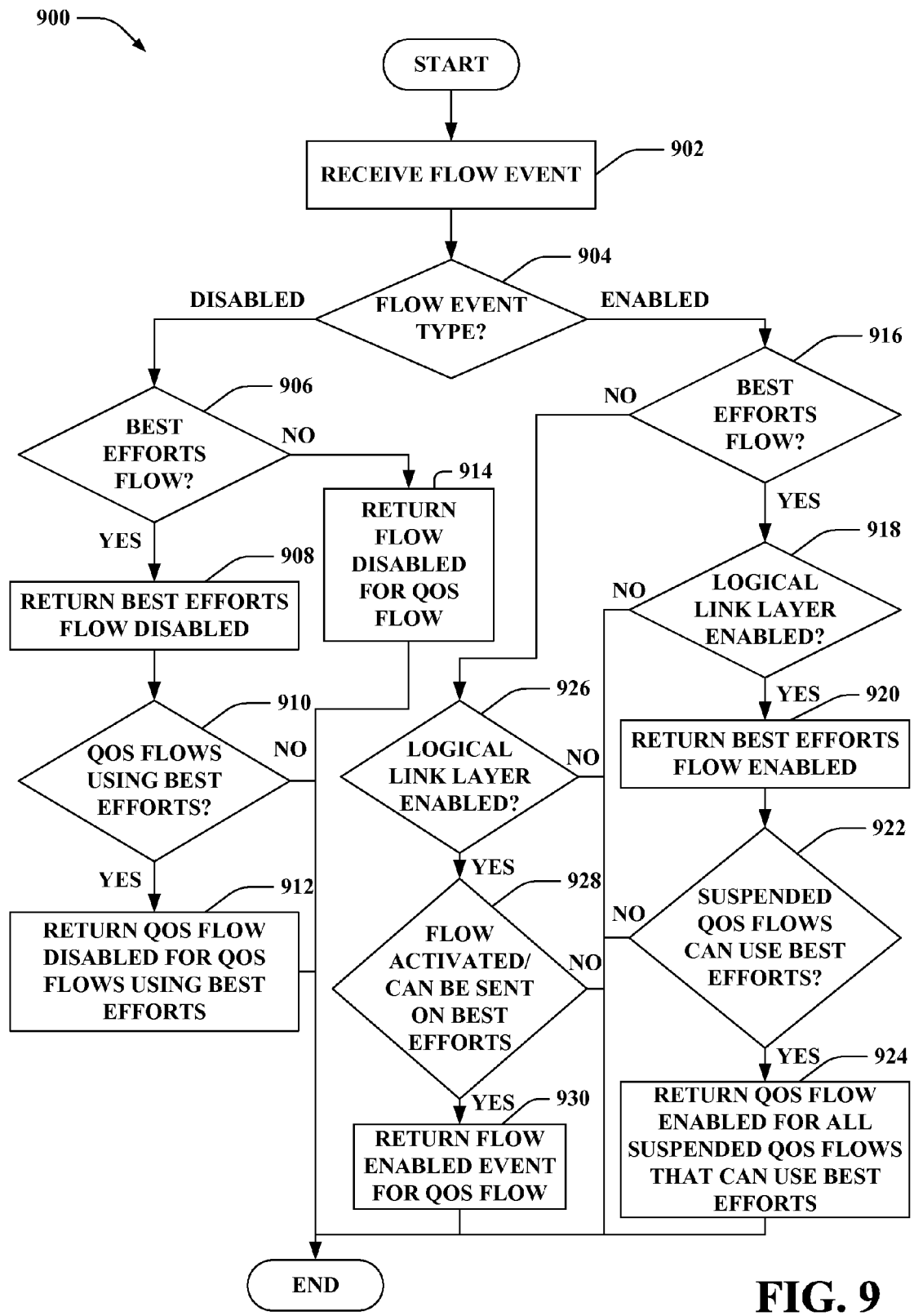
FIG. 9 is an illustration of an example methodology that facilitates handling flow enabled/disabled events.

Referring now to FIG. 9, an example methodology 900 is displayed that facilitates flow handling for flow enabled/disabled events. At 902, a flow event is received; for example, the event can be for enabling and/or disabling a flow. At 904, the flow event type is determined; if the flow event type is to disable the flow, then at 906, it is determined whether the flow is a best efforts flow. If so, then at 908, flow disabled is returned for the best efforts flow. Also, if the best efforts flow was previously active, then at 910 it is determined whether there are QOS flows currently utilizing the best efforts flow for transmission (e.g., if the QOS flow itself is disabled as described herein). If so, then at 912 QOS flow disabled is also returned for all QOS flows using the best efforts flow. If the flow determined at 906 is not a best efforts flow but a QOS flow, at 914 flow disabled is returned for the QOS flow.

If the flow event type indicates that the flow is enabled at 904, then at 916 it is determined whether the flow is a best efforts flow. If so, then at 918 it is determined whether a logical link layer related to the best efforts flow is enabled. This can be, for example, a phys_link related to the best efforts flow. If it is enabled, then at 920 best efforts flow enabled is returned indicating establishment (or re-establishment) of the best efforts flow. Additionally, if the logical link layer is enabled, it is determined whether there are suspended QOS flows that can use the best efforts flow for transmission at 922. If so, then at 924 QOS flow enabled is returned for all suspended QOS flows that can use the best efforts flow. If however the flow determined at 916 is not a best efforts flow but a QOS flow, then at 926 it is determined whether the logical link layer related to the QOS flow is enabled. If so, then at 928 it is determined whether the QOS flow is activated or if the QOS flow data can be sent using the best efforts flow. If so, flow enabled is returned for the QOS flow at 930.

Figure 10:
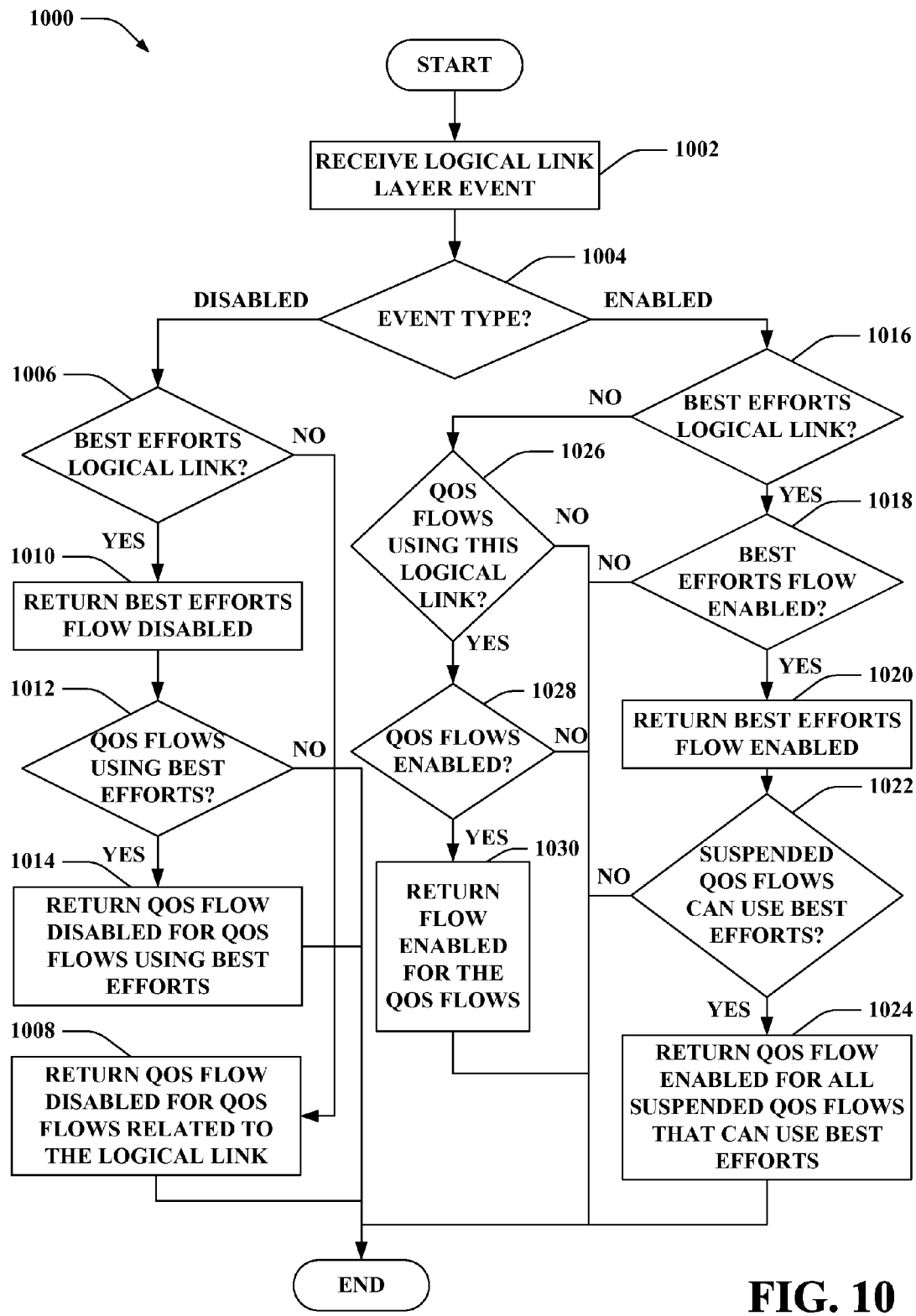
FIG. 10 is an illustration of an example methodology that facilitates handling logical link layer events.

Now turning to FIG. 10, another example methodology 1000 is illustrated for handling logical link layer events in providing QOS in wireless communications. At 1002, a logical link layer event is received. This can relate to status of communication over the logical link layer, for example. At 1004, an event type is determined. If the event relates to disabling the logical link layer, then at 1006 it is determined whether the logical link layer is related to the best efforts flow. If not, then at 1008 a QOS flow disabled is returned for QOS flows related to the logical link layer for which the event is occurring. If so, then at 1010 a best efforts flow disabled is returned. Additionally, it is determined whether QOS flows are using best efforts at 1012. If so, then at 1014 QOS flow disabled events are returned for those QOS flows using best efforts.

If the logical layer flow event type at 1004 is to enable a logical link layer, then at 1016 it is determined whether the logical link layer corresponds to the best efforts flow. If so, then at 1018 it is determined whether the best efforts flow is enabled. If it is, then at 1020 a best efforts flow enabled event is returned. Additionally, if there are suspended QOS flows that can use best efforts, as determined at 1022, then QOS flow enabled is returned for all suspended QOS flows that can use best efforts at 1024. If, however, the logical link layer does not correspond to the best efforts flow at 1016, then at 1026 it is determined whether there are QOS flow using this logical link. If so, then at 1028 it is determined whether those QOS flows are enabled. If the QOS flows are enabled, then at 1030 flow enabled events are returned for the QOS flows.

It will be appreciated that, in accordance with one or more aspects described herein, inferences can be made regarding, for example, determining whether a best efforts flow will suffice for transmitting QOS data, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
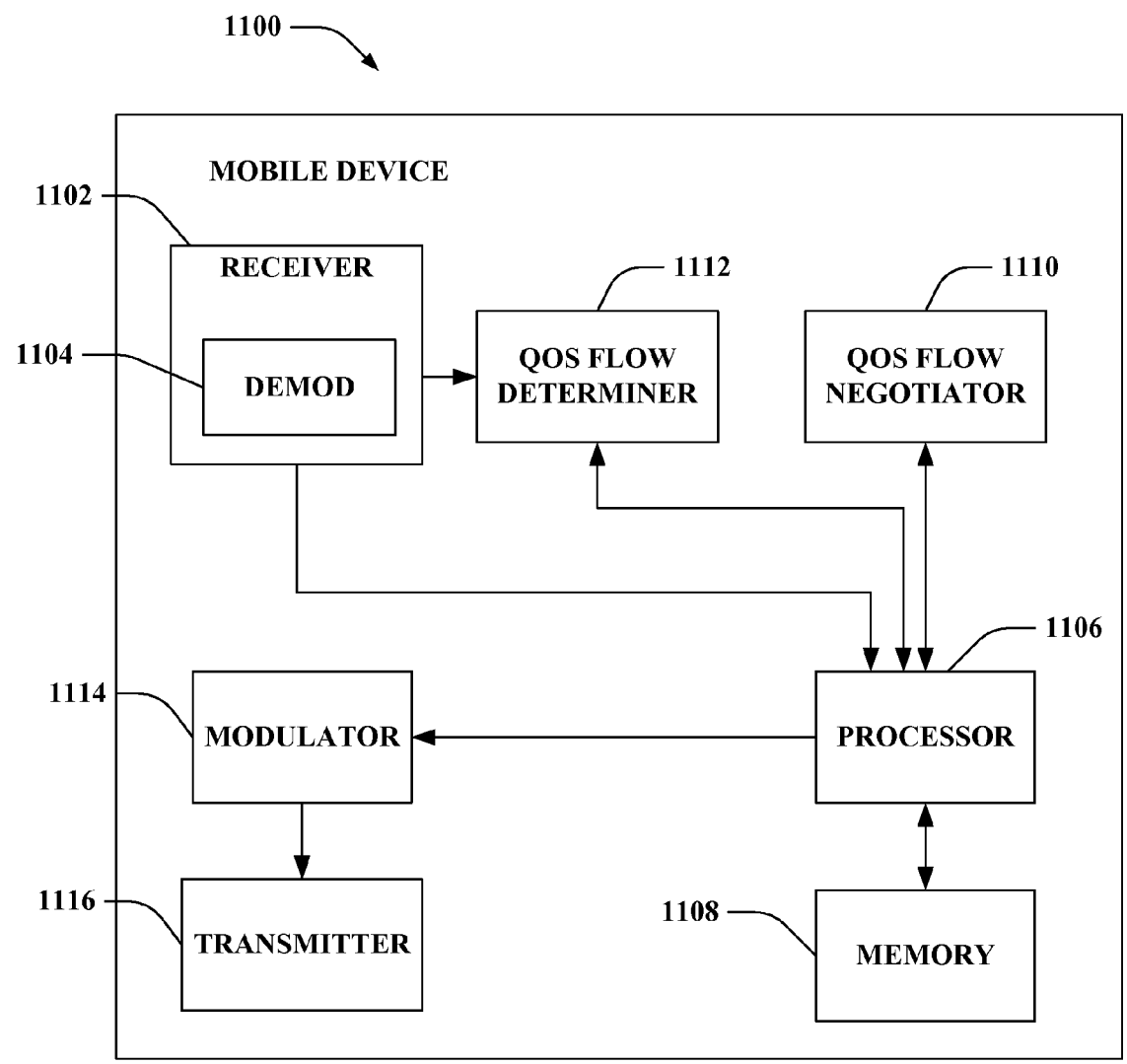
FIG. 11 is an illustration of an example mobile device that facilitates negotiating and determining QOS flows for data transmission.

FIG. 11 is an illustration of a mobile device 1100 that facilitates transmitting data over one or more QOS flows. Mobile device 1100 comprises a receiver 1102 that receives a signal from, for instance, a receive antenna (not shown), performs typical actions on (e.g., filters, amplifies, downconverts, etc.) the received signal, and digitizes the conditioned signal to obtain samples. Receiver 1102 can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1116, and controls one or more components of mobile device 1100.

Mobile device 1100 can additionally comprise memory 1108 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1108 can additionally store protocols and/or algorithms associated with estimating and/or utilizing a channel (e.g., performance based, capacity based, etc.).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Processor 1106 and/or receiver 1102 can further be operatively coupled to a QOS flow negotiator 1110 that establishes QOS flows with a wireless network as well as a QOS flow determiner 1112 that decides an appropriate QOS flow for transmitting data received from a host device (not shown). According to an example, the host device can request QOS for an application executing thereon; the QOS flow negotiator 1110 can subsequently negotiate QOS with the wireless network. If a QOS flow is established, the mobile device 1100 can transmit flow information to the host device; the information can comprise a flow identifier, among other items. The QOS flow determiner 1112 can receive application data from the host device to be transmitted on one or more QOS flows (e.g., from the host device), and the data can have a portion of the flow information attached to it, such as the flow identifier. Using this information, the QOS flow determiner 1112 can appropriately classify the data to the proper QOS flow for transmission thereover. Mobile device 1100 still further comprises a modulator 1114 and transmitter 1116 that respectively modulate and transmit signal to, for instance, a base station, another mobile device, etc. Although depicted as being separate from the processor 1106, it is to be appreciated that the QOS flow negotiator 1110, QOS flow determiner 1112, demodulator 1104, and/or modulator 1114 can be part of the processor 1106 or multiple processors (not shown).

Figure 12:
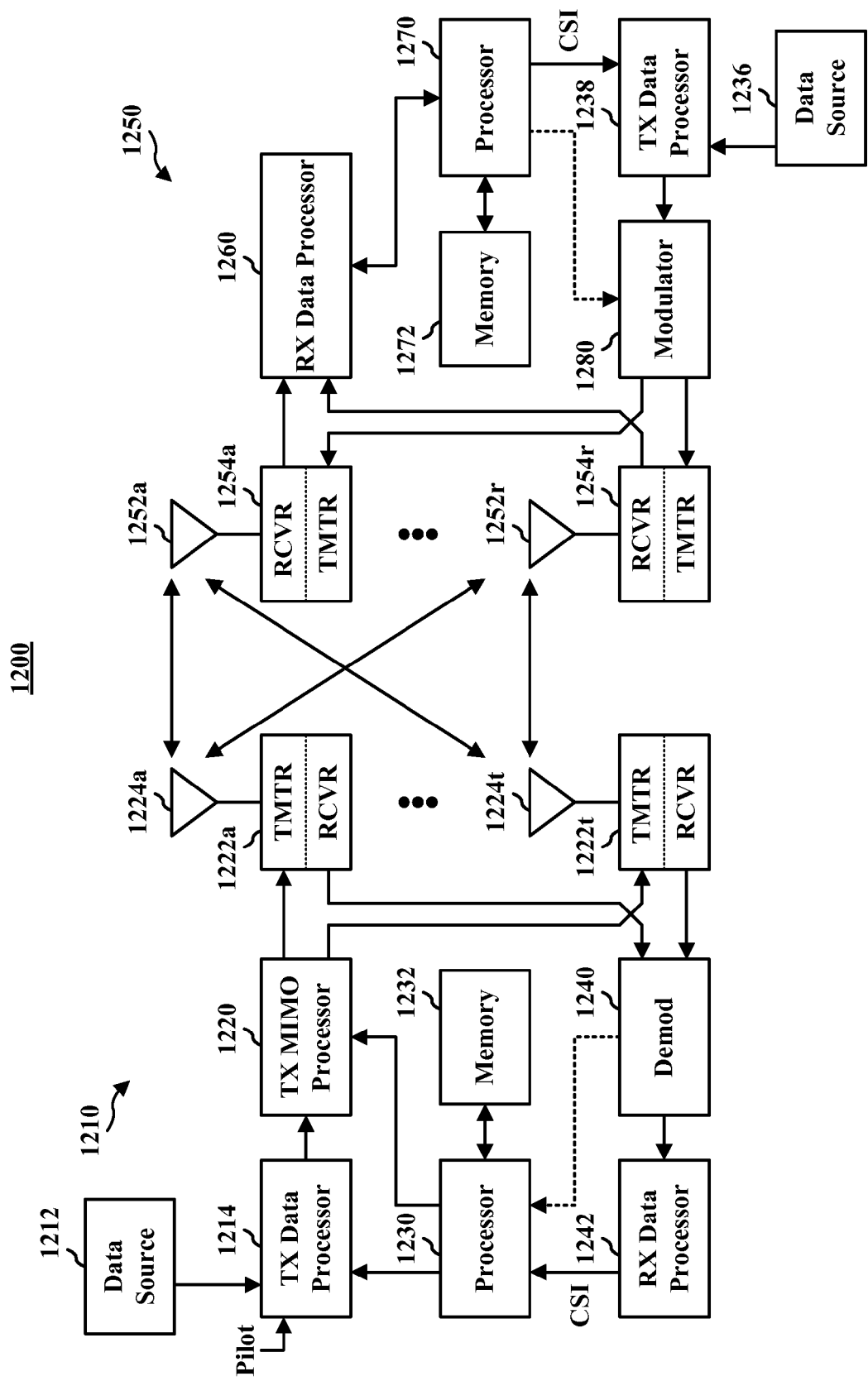
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-5 and 11), and/or methods (FIGS. 6-10) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222*a* through 1222*t*. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222*a* through 1222*t* are transmitted from $N_T$ antennas 1224*a* through 1224*t*, respectively.

At mobile device 1250, the transmitted modulated signals are received by $N_R$ antennas 1252*a* through 1252*r* and the received signal from each antenna 1252 is provided to a respective receiver (RCVR) 1254*a* through 1254*r*. Each receiver 1254 conditions (e.g., filters, amplifies, and down-converts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254*a* through 1254*r*, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
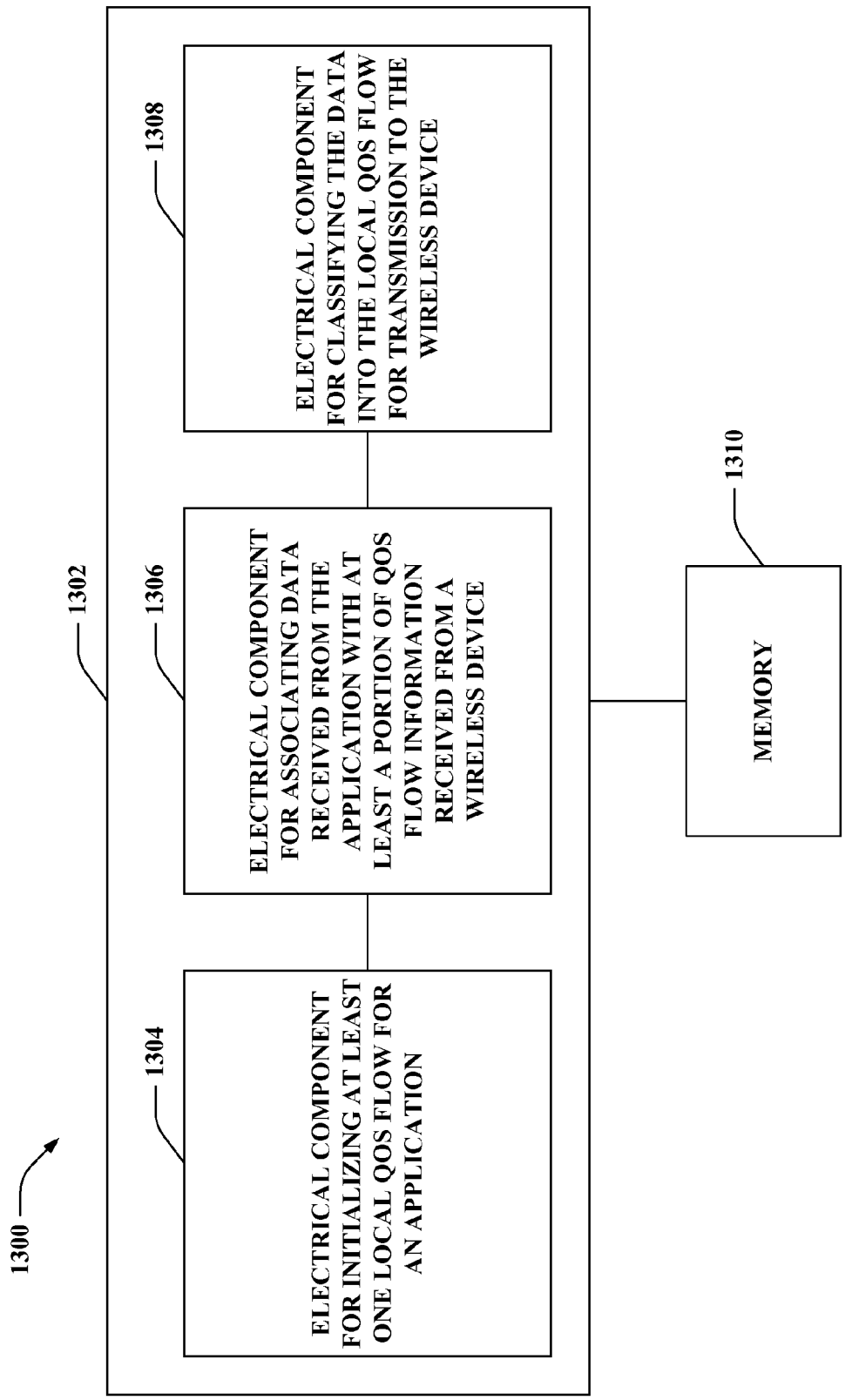
FIG. 13 is an illustration of an example system that manages QOS for transmission over a wireless device.

With reference to FIG. 13, illustrated is a system 1300 that facilitates host-based QOS classification and management in wireless communications. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for initializing at least one local QOS flow for an application 1304. For example, the local QOS flow can correspond to a QOS flow on a wireless device based on information regarding the wireless device QOS flow. Further, logical grouping 1302 can comprise an electrical component for associating data received from the application with at least a portion of QOS flow information received from a wireless device 1306. Thus, as described, information regarding the wireless device QOS flow can be associated with data to be transmitted thereon. In this regard, the system 1300 can decide which QOS flow to use, and the wireless device can utilize the correct flow based on the information associated with the data. Moreover, logical grouping 1302 can comprise an electrical component for classifying the data into the local QOS flow for transmission to the wireless device 1308. Thus, once the device receives the data, it can properly classify it in the QOS flow indicated in the attached information. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

Figure 14:
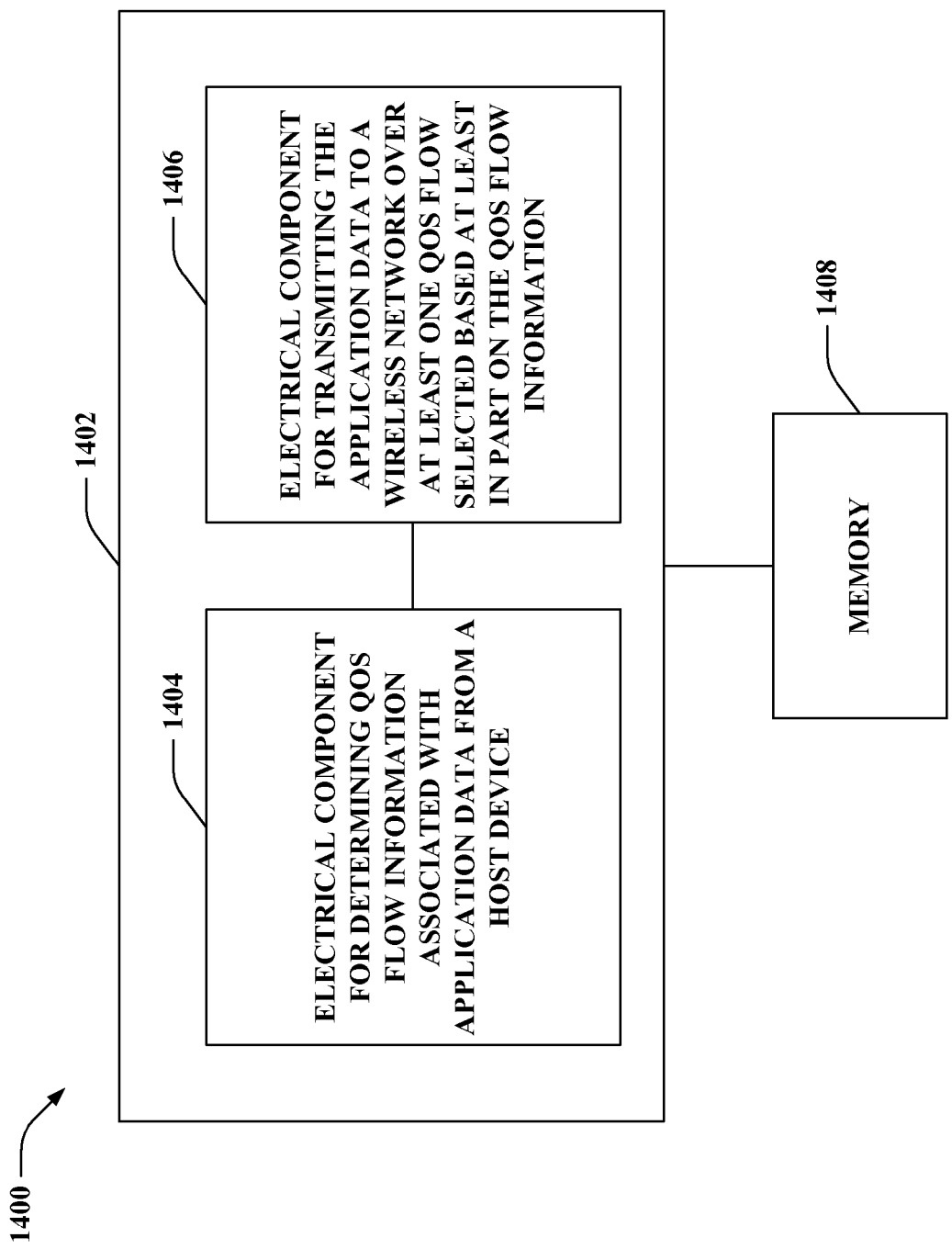
FIG. 14 is an illustration of an example system that transmits QOS data to a wireless network on behalf of a host device.

Turning to FIG. 14, illustrated is a system 1400 that transmits application data over one or more QOS flows based at least in part on flow information received from a host device. System 1400 can reside within a base station, mobile device, etc., for instance. As depicted, system 1400 includes functional blocks that can represent functions implemented by a processor, software, or combination thereof (e.g., firmware). System 1400 includes a logical grouping 1402 of electrical components that facilitate transmitting application data over the appropriate QOS flows. Logical grouping 1402 can include an electrical component for determining QOS flow information associated with application data from a host device 1404. As described, the application data can have an attached flow identifier and/or other information to guide the data to the appropriate QOS flow. Moreover, logical grouping 1402 can include an electrical component for transmitting the application data to a wireless network over at least one QOS flow selected based at least in part on the QOS flow information 1406. Thus, the host device can determine how to route application data on the given QOS flows, and the flow information associated with the application data can specify the routing. Additionally, system 1400 can include a memory 1408 that retains instructions for executing functions associated with electrical components 1404 and 1406. While shown as being external to memory 1408, it is to be understood that electrical components 1404 and 1406 can exist within memory 1408.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for providing quality of service (QOS) to one or more applications being executed by a host device without a wireless communication connection, comprising:

classifying, by a host device without a wireless communication connection, data received from an application executed by the host device, in one or more local QOS flows related to the application;

tagging, by the host device, the data with an identifier identifying at least one of the one or more local QOS flows;

transmitting, by the host device, the tagged data from the one or more local QOS flows to a separate wireless device for transmission over a wireless network;

receiving a flow control disabled status from the wireless device related to the one or more local QOS flows;

queuing subsequently received data from the application in response to the flow control disabled status;

transmitting the queued data over the one or more local QOS flows upon receiving a flow control enabled status; and requesting, by the host device, QOS from the wireless device based at least in part on a request received from the application, so that the wireless device will negotiate QOS with the wireless network.

2. The method of claim 1, wherein data transmission processing is shared between the host device and the wireless device for data to be transmitted onto the wireless network by the wireless device.

3. The method of claim 1, further comprising receiving, by the host device, a request validation from the wireless device comprising the identifier if a request for QOS was received by the wireless device.

4. The method of claim 3, the request validation further comprising flow parameters and filter parameters.

5. The method of claim 1, further comprising receiving flow parameters, filter parameters, and a flow identifier from the wireless device based at least in part on QOS initiated by the wireless network.

6. The method of claim 1, further comprising providing one or more local best efforts flows and classifying data received from a disparate application in one or more disparate local QOS flows or the one or more local best efforts flows related to the disparate application.

7. The method of claim 6, further comprising tagging the data received from the disparate application with a disparate identifier received from the wireless device and related to the one or more disparate local QOS flows or the one or more local best efforts flows.

8. The method of claim 1, further comprising
receiving a flow event from the wireless device for the one or more local QOS flows;
classifying application data in the one or more local QOS flows if a first flow event occurs; and
classifying application data in one or more local best efforts flows if a second flow event occurs.

9. The method of claim 1, further comprising:
negotiating, by the wireless device, one or more QOS flows with the wireless network based on the request received from the host device.

10. The method of claim 1, wherein the host device negotiates QOS with the wireless network only through the wireless device.

11. The method of claim 1, further comprising connecting the host device to the wireless network through the wireless device for communication of data between the host device and the wireless network.

12. The method of claim 11, further comprising:
connecting the host device to the network device;
containing the host device in a node within the wireless network; and
containing the wireless device in the same node within the wireless network.

13. The method of claim 1, further comprising containing the host device in a housing of a mobile device and containing the wireless device in the same housing.

14. The method of claim 1, further comprising:
providing the host device with a first processor configured to:
classify data received from the application in the one or more local QOS flows related to the application;
tag the data with an identifier identifying the at least one of the one or more local QOS flows;
transmit the tagged data from the one or more local QOS flows to the wireless device for transmission over a wireless network; and
request QOS from the wireless device based at least in part on the request received form the application, so that the wireless device will negotiate QOS with the wireless network;
providing the wireless device with a second processor configured to negotiate QOS with the with the wireless network;
containing the first processor in a housing of a mobile device; and
containing the second processor in the same housing of a mobile device.

15. The method of claim 14, wherein the first processor executes the application.

16. An apparatus for providing quality of service (QOS) to one or more applications being executed by a host device without a wireless communication connection, comprising:
at least one processor configured to:
create one or more local QOS flows for an application executed by a host device without a wireless communication connection, based at least in part on QOS flow information received from a wireless device;
filter data received from the application to the one or more local QOS flows;
tag data in the one or more local QOS flows with an identifier identifying at least one of the one or more local QOS flows;
transmit the tagged data from the one or more local QOS flows to the wireless device; and
transmit a QOS request to the wireless device based at least in part on the request for QOS received from the application, so that the wireless device will negotiate QOS with the wireless network;
receive a flow control disabled status from the wireless device related to the one or more local QOS flows and queue subsequent data classified in the one or more local QOS flows; and
a memory coupled to the at least one processor.

17. The apparatus of claim 16, wherein data transmission processing is shared between the apparatus and the wireless device for data to be transmitted onto the wireless network by the wireless device.

18. The apparatus of claim 16, the at least one processor further configured to create one or more disparate local QOS flows for a disparate application based at least in part on disparate information received from the wireless device related to the disparate application.

19. The apparatus of claim 18, the at least one processor further configured to filter data of the disparate application into the one or more disparate local QOS flows.

20. The apparatus of claim 19, the at least one processor further configured to tag data in the one or more disparate local QOS flows with at least a portion of the disparate information received from the wireless device and transmit the disparate tagged data to the wireless device via the one or more disparate QOS flows.

21. The apparatus of claim 16, the at least one processor further configured to receive flow parameters, filter parameters, and a flow identifier from the wireless device based at least in part on QOS initiated by a wireless network.

22. The apparatus of claim 16, the at least one processor further configured to
receive an flow indication related to the one or more QOS flows;
classify application data in the one or more local QOS flows if a first flow indication is received; and
classify the application data in one or more best efforts flows if a second flow indication is received.

23. The apparatus of claim 16, wherein the apparatus negotiates QOS with wireless network only through the wireless device.

24. An apparatus that facilitates host-based quality of service (QOS) classification and flow control in wireless communications for providing QOS to one or more applications being executed by a host device without a wireless communication connection, comprising:
- means for initializing at least one local QOS flow for an application executed by a host device without a wireless communication connection;
- means for associating data received from the application with an identifier identifying one or more of the at least one local QOS flow;
- means for requesting QOS from the wireless device based at least in part on a request received from the application, so that the wireless device will negotiate QOS with the wireless network;
- means for receiving a flow control disabled status from the wireless device related to the one or more local QOS flows and queueing subsequent data classified in the one or more local QOS flows; and
- means for classifying the data into the local QOS flow for transmission to the wireless device.

25. The apparatus of claim 24, further comprising means for initializing at least one disparate local QOS flow for a disparate application.

26. The apparatus of claim 25, further comprising means for associating data of the disparate application with at least a portion of disparate QOS flow information received from the wireless device.

27. The apparatus of claim 26, further comprising means for transmitting the data of the disparate application to the wireless device over the disparate local QOS flow.

28. The apparatus of claim 24, wherein the apparatus negotiates QOS with wireless network only through the wireless device.

29. A computer program product for providing quality of service (QOS) to one or more applications being executed by a host device without a wireless communication connection, comprising: a non-transitory computer-readable medium comprising:
- code for causing at least one computer to classify data received from an application executed by a host device without a wireless communication connection, in one or more local QOS flows related to the application;
- code for causing the at least one computer to tag the data with an identifier identifying at least one of the one or more local QOS flows;
- code for causing the at least one computer to transmit the tagged data from the one or more local QOS flows to a wireless device for transmission over a wireless network;
- code for causing the at least one computer to receive a flow control disabled status from the wireless device related to the one or more local QOS flows and queue subsequent data classified in the one or more local QOS flows; and
- code for requesting QOS from the wireless device based at least in part on a request received from the application, so that the wireless device will negotiate QOS with the wireless network.

30. The computer program product of claim 29, wherein the computer-readable medium further comprises code for negotiating QOS with wireless network only through the wireless device.

31. A method for providing quality of service (QOS) to one or more applications being executed by a host device or tethered processor without a wireless communication connection, comprising:
- receiving, by a wireless device, application data of an application executed by a host device without a wireless communication connection, from a host device for QOS transmission in a wireless network;
- extracting, by the wireless device, a tag from the application data that identifies at least one respective QOS flow for transmission;
- transmitting, by the wireless device, the application data to the wireless network according to a requested QOS from the host device using the respective QOS flow;
- receiving a flow control disabled status from the wireless device related to one or more local QOS flows;
- queuing subsequently received data from the application in response to the flow control disabled status;
- transmitting the queued data over the one or more local QOS flows upon receiving a flow control enabled status; and
- negotiating, by the wireless device, the respective QOS flow with the wireless network based at least in part on the requested QOS from the host device for the application.

32. The method of claim 31, wherein data transmission processing is shared between the host device and the wireless device for data to be transmitted onto the wireless network by the wireless device.

33. The method of claim 31, further comprising returning information to the host device in response to the requested QOS, at least a portion of the information is comprised in the tag.

34. The method of claim 31, further comprising receiving a flow suspend message for the respective QOS flow on the wireless network.

35. The method of claim 34, further comprising transmitting subsequent application data received from the host device related to the respective QOS flow over a best efforts flow.

36. The method of claim 35, further comprising activating the respective QOS flow and transmitting subsequent application data related to the respective QOS flow thereover.

37. The method of claim 35, further comprising transmitting a flow disabled status to the host device based on the flow suspend message, receiving a flow disabled message related to the best efforts flow and/or receiving a logical link layer disabled message related to the respective QOS flow.

38. The method of claim 37, further comprising transmitting a flow enabled status to the host device based on receiving a flow enabled message related to the best efforts flow.

39. The method of claim 31, further comprising receiving flow parameters, filter parameters, and a flow identifier from the wireless network based at least in part on QOS initiated by the wireless network.

40. The method of claim 39, further comprising transmitting the flow parameters, filter parameters, and/or the flow identifier to the host device.

41. The method of claim 31, wherein the wireless device does not classify application data except by classifying tags extracted from the application data that identify at least one QOS flow.

42. A wireless communications apparatus for providing quality of service (QOS) to one or more applications being executed by a host device without a wireless communication connection, comprising:
- at least one processor configured to:
  - determine at least one respective QOS flow identifier, identifying at least one QOS flow, appended to application data of an application executed by a host device without a wireless communication connection, received from a host device;
remove the appended information from the application data;
receive a request output by the host device for QOS, the request being created based at least in part on a request received by the host device from the application;
negotiate one or more QOS flows with the wireless network based on the received request;
transmit the application data to a wireless network over a QOS flow based on the respective QOS flow identifier;
receive a flow control disabled status from the wireless device related to the one or more QOS flows;
queue subsequently received data from the application in response to the flow control disabled status;
transmit the queued data over the one or more QOS flows upon receiving a flow control enabled status; and
a memory coupled to the at least one processor.

43. The wireless communications apparatus of claim 42, wherein data transmission processing is shared between the host device and the wireless communications apparatus for data to be transmitted onto the wireless network by the wireless communications apparatus.

44. The wireless communications apparatus of claim 43, the at least one processor further configured to transmit the respective QOS flow identifier to the host device based at least in part on the negotiating the QOS flow with the wireless network.

45. The wireless communications apparatus of claim 42, the at least one processor further configured to receive a flow suspended status for the QOS flow.

46. The wireless communications apparatus of claim 45, the at least one processor further configured to transmit subsequent data of the application received from the host device related to the QOS flow over a best efforts flow.

47. The wireless communications apparatus of claim 42, the at least one processor further configured to receive a disabled status for a logical link channel, a flow disabled status for the QOS flow or a flow suspended status for the QOS flow from a wireless network.

48. The wireless communications apparatus of claim 47, the at least one processor further configured to transmit a flow disabled status for the QOS flow to the host device.

49. The wireless communications apparatus of claim 48, the at least one processor further configured to transmit a flow enabled status for the QOS flow to the host device upon receiving an enabled status for the logical link channel.

50. The wireless communications apparatus of claim 42, the at least one processor further configured to receive flow parameters, filter parameters, and a flow identifier from a wireless network based at least in part on QOS initiated by the wireless network.

51. The wireless communications apparatus of claim 50, the at least one processor further configured to transmit the flow parameters, filter parameters, and/or the flow identifier to the host device.

52. The wireless communications apparatus of claim 42, wherein the wireless device does not classify application data except by classifying tags extracted from the application data that identify at least one QOS flow.

53. A wireless communications apparatus for providing wireless network quality of service (QOS) for host-based QOS managed applications being executed by a host device without a wireless communication connection, comprising:
means for determining at least one QOS flow identifier, identifying at least one QOS flow, associated with application data of an application executed by a host device without a wireless communication connection, from the host device;
means for transmitting the application data to a wireless network over at least one QOS flow selected based at least in part on the QOS flow identifier;
means for receiving a request output by the host device for QOS, the request being created based at least in part on a request received by the host device from the application;
means for receiving a flow control disabled status from the wireless device related to one or more QOS flows;
means for queuing subsequently received data from the application in response to the flow control disabled status;
means for transmitting the queued data over the one or more QOS flows upon receiving a flow control enabled status; and
means for negotiating the QOS flow with the wireless network based on the request for QOS.

54. The wireless communications apparatus of claim 53, further comprising means for receiving a request for QOS for the application from the host device.

55. The wireless communications apparatus of claim 54, wherein data transmission processing is shared between the host device and the wireless communications apparatus for data to be transmitted onto the wireless network by the wireless communications apparatus.

56. The wireless communications apparatus of claim 55, further comprising means for transmitting QOS flow information to the host device based at least in part on the QOS flow negotiation.

57. The wireless communications apparatus of claim 53, wherein the wireless device does not classify application data except by classifying tags extracted from the application data that identify at least one QOS flow.

58. A computer program product for providing quality of service (QOS) to one or more applications being executed by a host device without a wireless communication connection, comprising: a non-transitory computer-readable medium comprising:
code for causing a computer to receive application data of an application executed by a host device without a wireless communication connection, from the host device for QOS transmission in a wireless network;
code for causing the computer to extract a tag from the application data that identifies at least one respective QOS flow for transmission;
code for causing the computer to transmit the application data to the wireless network using the respective QOS flow;
code for requesting QOS based at least in part on a request received from the application;
code for receiving a flow control disabled status from the wireless device related to one or more local QOS flows;
code for queuing subsequently received data from the application in response to the flow control disabled status;
code for transmitting the queued data over the one or more local QOS flows upon receiving a flow control enabled status; and
code for negotiating one or more QOS flows with the wireless network based on the request received from the host device.

59. The computer program product of claim 58, wherein the code does not cause the wireless device to classify application data except by classifying tags extracted from the application data that identify at least one QOS flow.

* * * * *